April 2, 1968 W. R. NUGENT 3,376,428

DRY-SWITCHING RELAY BINARY LOGIC APPARATUS

Filed Aug. 11, 1964 9 Sheets-Sheet 1

INVENTOR
WILLIAM R. NUGENT

BY *Russell, Chittick & Pfund*
ATTORNEYS

INVENTOR
WILLIAM R. NUGENT

BY Russell, Chittick & Pfund
ATTORNEYS

INVENTOR.
WILLIAM R. NUGENT
BY
Russell, Chittick & Pfund

SERIAL DELAY LINE

SHIFT REGISTER

INVENTOR
WILLIAM R. NUGENT

BY Russell, Chittick & Pfund
ATTORNEYS

SET- RESET FLIP FLOP
SET DOMINANT

SET-RESET FLIP FLOP
RESET DOMINANT
STORAGE

INVENTOR
WILLIAM R. NUGENT
BY
Russell, Chittick & Pfund
ATTORNEYS

BINARY COUNTER

BINARY COUNTER

INVENTOR
WILLIAM R. NUGENT

BY *Russell, Chittick & Pfund*
ATTORNEYS

DRY-SWITCHING RELAY BINARY LOGIC APPARATUS

Filed Aug. 11, 1964

BINARY DOWN-COUNTER

INVENTOR
WILLIAM R. NUGENT

BY Russell, Chittick & Pfund
ATTORNEYS

April 2, 1968 W. R. NUGENT 3,376,428

DRY-SWITCHING RELAY BINARY LOGIC APPARATUS

Filed Aug. 11, 1964 9 Sheets-Sheet 8

BINARY UP-DOWN COUNTER

INVENTOR
WILLIAM R. NUGENT

BY *Russell, Chittick & Bund*
ATTORNEYS

SINGLE PULSE GENERATOR

NON-SUCCESSIVE PHASE ARRANGEMENT

INVENTOR
WILLIAM R. NUGENT

BY Russell, Chittick & Pfund
ATTORNEYS

United States Patent Office 3,376,428

Patented Apr. 2, 1968

3,376,428
DRY-SWITCHING RELAY BINARY LOGIC APPARATUS

William R. Nugent, Lexington, Mass.
(8 Ravenscroft Road, Winchester, Mass. 01890)

Filed Aug. 11, 1964, Ser. No. 388,757
9 Claims. (Cl. 307—136)

ABSTRACT OF THE DISCLOSURE

An apparatus which utilizes polyphase power and relays to form logical networks by dry switching the relay contacts.

This invention relates to electrical apparatus and more particularly to electrical apparatus utilizing relays in a dry-switching mode of operation.

In conventional relay circuits changes of state are usually effected by "wet-switching" the appropriate relay contacts to make or break an energized circuit. The term "wet-switching" refers to the energized condition of the relay contacts at the instant of making or breaking the particular circuit. For example, in relay circuits which perform logical operations, power is applied to the input of combinational contact paths and as given combinations are either completed or broken, the power is immediately applied to the coils of other relays or removed therefrom. Since the current flow through the relay contacts is either initiated or interrupted by relay contact switching, the relays are said to be operated in a "wet-switching" mode.

In contrast to the "wet-switching" mode of operation, described above, relays can also be operated in what is known as a "dry-switching" mode. Unfortunately, the term "dry-switching" has a certain degree of ambiguity because the term has been used in the art to describe the switching of very low levels of voltage and currents, e.g., 100 millivolts open circuit potential and 100 milliamps closed circuit current flow. It should be understood, however, that the term "dry-switching" as used herein refers to the switching of relay contacts which are completely de-energized during contact opening and closing, i.e., there is no voltage or current during the active part of the switching.

The distinction between "wet" and "dry" relay switching in a large measure determines the ultimate feasibility of using relays for a particular circuit application. In a majority of relay circuit applications wet-switching is the usual mode of operation and most relay specifications, such as maximum contact current and number of operations in expected life, are based on data derived from relay testing under wet-switching conditions. It is well known that the mechanical life of a relay exceeds by at least an order of magnitude the rated electrical life of the relay and that the usual cause of the final relay failure is attributable to the ravages of wet-switching. A high quality relay whose contacts are required to switch only low levels of current may have a life expectancy as high as $2\times10^8$ operations, but when an identical relay is required to switch its maximum rated contact current, its expected life may drop as low as $10^5$ operations.

A relay's maximum dry-switching contact current is normally determined by the relay's contact current carrying capability as limited by such factors as contact resistance, contact weld-point and the concomitant heating effects. The normal maximum rated contact current, however, is generally much lower and is based on wet-switching of resistive loads. When resistive loads are wet-switched, the rupturing of the flowing currents causes arcing which pits the contact points and eventually produces a highly resistive oxide coating on the relay contacts. Moreover, relay contact bounce on opening and closing will aggravate the deterioration of the contact and, of course, if inductive loads instead of resistive loads are switched, even worse contact deterioration will occur.

The ravages of wet-switching can be partially alleviated by using mercury-wetted contact relays which have a thin film of liquid mercury on each relay contact. The mercury film absorbs the relay contact bounce on closure and stretches out with an opening contact until a distance too great for arc formation has been reached. The reliability and long life expectancy (over a billion operations) of the mercury-wetted contact relays indicates what can be achieved if the destructive effects of wet-switching are substantially negated. Unfortunately, mercury-wetted contact relays can be obtained only with a limited number of contacts per relay and at a not inconsequential premium. At present the mercury-wetted contact relays have a maximum of 4D (make-before-break transfer) contacts and such relays cost several times that of conventional telephone relays or instrumentation relays.

Thus, although conventional dry-contact relays can be used in a wet-switching mode of operation for most low speed, low utilization applications and, while the mercury-wetted contact relays do provide a high degree of reliability in more stringent applications albeit at a higher initial cost and with fewer relay contacts, there is still no currently available relay circuitry which can be used under the simultaneous constraints of high reliability, low initial cost and high contact pileup. It is accordingly an object of the present invention to provide an electrical apparatus which uses low cost, conventional relays in a dry-switching mode of operation to achieve high reliability and a long life expectancy.

In the accomplishment of this object, I employ a plurality of inexpensive, conventional relays which have the requisite number of relay contacts to form the desired contact operating paths. The relays and contact paths are energized by plural phase control signals so that relay switching, i.e., relay coil energization and de-energization, is produced by one phase of the plural phase control signals while the relay contact paths are energized by another phase of the control signals. In this manner, the relay contacts are de-energized whenever changes of state are effected and, therefore, all relay contact switching is dry-switching.

In many computer applications the constancy of use of the switching element, rather than its switching speed, now dictates semiconductor logic instrumentation. However, the dry-switching relay apparatus of the instant invention is eminently suitable for such applications and offers the computer manufacturer a feasible economic alternative to semiconductor circuitry. It is therefore still another object of the present invention to provide dry-switching logic networks for combinational as well as sequential logic.

It is a feature of the present invention that in the preferred logic embodiments thereof the times for sensing the state of the logic elements are definitely separated from the times in which predetermined elements are required to change their state as a result of the provious network sensing.

It is another object of the invention to provide a dry-switching relay circuit which eliminates the usual ambiguity, hazards and race conditions which occur during the contact transit time of relays undergoing changes of state.

These and other objects and features of the invention will best be understood from a more detailed description of the preferred embodiments thereof, selected for purposes of illustration, and shown in the accompanying drawings in which.

Figure 1:
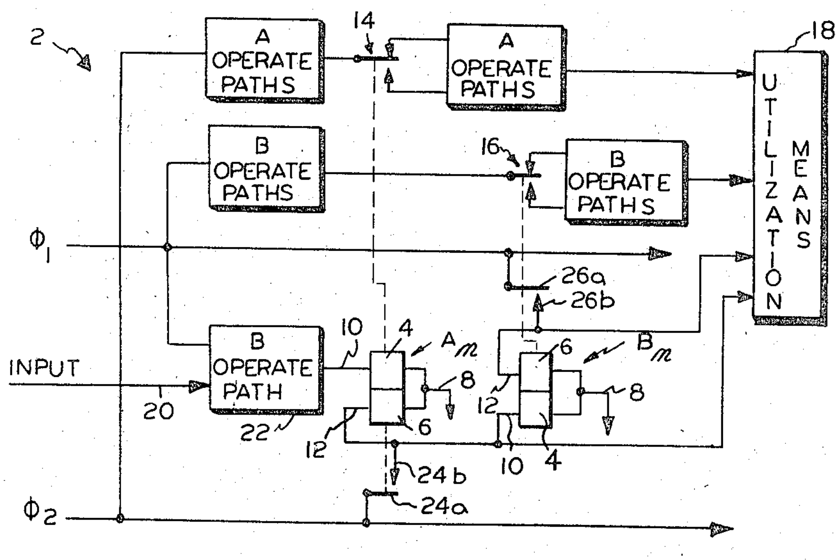
FIG. 1 is a block diagram of a dry-switching relay apparatus.

Referring now to the drawings, FIG. 1 depicts in block diagram the general circuit configuration of the dry-switching relay apparatus, indicated generally by the reference numeral 2. The dry-switching relay apparatus 2 is instrumented by using two identical relays indicated generally as $A_n$ and $B_n$. The nomenclature of A and B relays is arbitrary and will be used throughout the following description to designate two general classes of relays which are associated with two corresponding classes of control signals i.e. $\phi 1$ and $\phi 2$. The A relays are defined as those relays which are initially operated by $\phi 1$ control signals while the B relays are initially operated by $\phi 2$ signals. The control signals for relays $A_n$ and $B_n$ can be obtained from any one of a number of well known devices which produce an alternating plural phase output. As shown in the timing diagram of FIG. 2, the control signals are pulsating antiphase direct current, however, it should be understood that this is merely illustrative of one possible signal waveform and that the invention is not limited thereto.

The $A_n$ and $B_n$ relays are double coil relays connected in parallel-aiding with each relay having an "operating" coil 4 and a "holding" coil 6. The holding coils 6 are normally designed to have a higher electrical resistance than the corresponding operating coils 4 in order to minimize the power requirements of the relay switching system. If the system power requirements for the particular instrumentation are not considered to be the controlling parameters, then two coils having identical electrical characteristics, such as, two operating coils 4, can be employed to achieve the desired dry-switching of the relay contacts.

In order to avoid any semantic confusion in the following description, the adjectives "operating" and "holding" will refer only to the functions of coils 4 and 6 and do not imply any qualitative electrical distinction between the two coils. Thus the $A_n$ and $B_n$ relay operating coils 4 initially energize i.e., "operate" the respective relays while the holding coils 6 "hold" the relays in an energized condition.

The polarity of the applied voltages for energizing relays $A_n$ and $B_n$ is not important provided that an internal consistency is maintained within the circuit. In all of the accompanying drawings the common lead 8 of the relay operating and holding coils 4 and 6, respectively, is assumed to be positive relative to the corresponding input leads 10 and 12. Therefore, given a common power supply reference, the relay coils can be energized either by "grounding" the respective input leads 10 and 12 or by applying a negative pulse i.e. either the $\phi 1$ or the $\phi 2$ control signal, to the appropriate input lead.

The $A_n$ and $B_n$ relays, in addition to having both an operating coil 4 and a holding coil 6, also have a plurality of relay contacts which form A and B operate paths, respectively. For purposes of clarity, the relays $A_n$ and $B_n$ are shown in FIG. 1 with only one set of transfer contacts, indicated generally as 14 and 16, respectively, and one "make" contact identified by the reference numerals 24*a*, 24*b* and 26*a*, 26*b*, respectively. The $A_n$ relay transfer contacts 14 and make contacts 24*a* and 24*b* form $\phi 2$ energized A operate paths to the utilization means 18 while the corresponding $B_n$ relay contacts 16 and 26*a* and 26*b* form $\phi 1$ energized B operate paths to the same utilization means 18. In some instrumentations where common circuitry and attendent feedback do not present a problem, the make contacts 24*a*, 24*b* and 26*a*, 26*b* can serve a dual function as both holding contacts for the $A_n$ and $B_n$ relays, respectively, and as A and B operate paths, i.e., signal sources, for the utilization means 18. However, since these contacts usually form holding paths for their respective relays and/or operate paths for other relays, they will be identified hereinafter in terms of their functions rather than as A and B operate paths.

In order to achieve the dry-switching of transfer contacts 14 and 16, that is, switching of contacts 14 during $\phi 1$ and contacts 16 during $\phi 2$, the following requirements must be fulfilled:

(1) The during of the $\phi 1$ pulse must be greater than the operate or "pull-in" time of the $A_n$ relay and must also be greater than the release or "drop-out" time of the $B_n$ relay;

(2) The duration of the $\phi 2$ pulse must be greater than the operate time of the $B_n$ relay and must also be greater than the release time of the $A_n$ relay;

(3) The $\phi 1$ voltage must be sufficient to operate the $A_n$ relay and also sufficient to hold the $B_n$ relay;

(4) The $\phi 2$ voltage must be sufficient to operate the $B_n$ relay and also sufficient to hold the $A_n$ relay;

(5) The $\phi 1$ pulse must occur during the time that the $\phi 2$ pulse is off and conversely, the $\phi 2$ pulse must occur during the time that the $\phi 1$ pulse is off; and (6) One pulse must always be present.

Exceptions to the fifth and sixth requirements, i.e., both pulses on or both pulses off, may occur for a time which is relatively small with respect to the operate and release times of the $A_n$ and $B_n$ relays.

Figure 2:
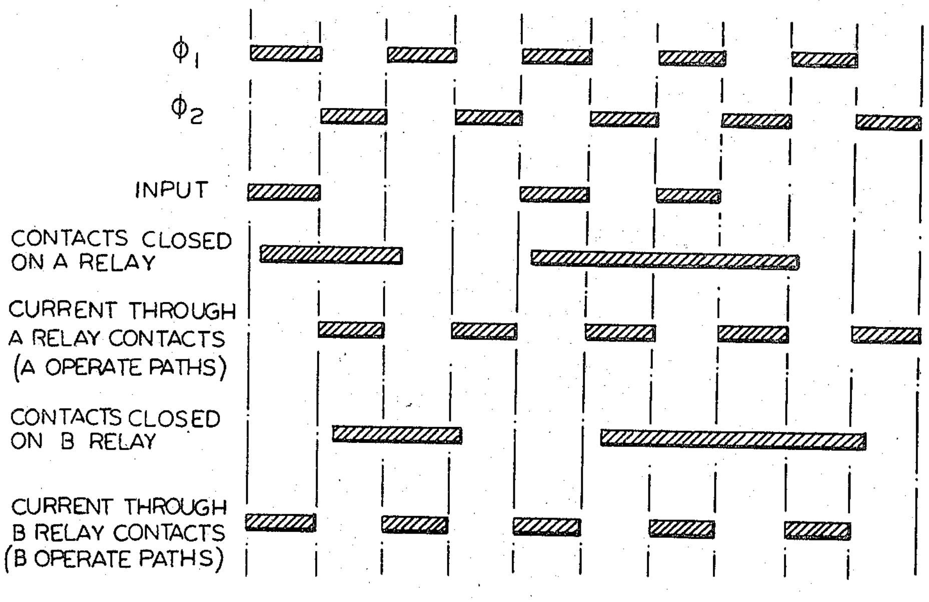
FIG. 2 is a timing diagram for the circuit depicted in FIG. 1.

The operation of the dry-switching relay circuit depicted in FIG. 1 can best be understood by examining the circuitry thereof in conjunction with the corresponding timing diagram shown in FIG. 2. An external input on line 20 provides a B operate path 22 for the operating coil 4 of relay $A_n$. If the input pulse occurs during $\phi 1$, as shown in the timing diagram of FIG. 2, a $\phi 1$ pulse will probe the B operate path 22 and energize the operating coil 4 of relay $A_n$. The energization of the $A_n$ operating coil 4 causes the $A_n$ relay armature (not shown) to pull-in thereby switching the transfer contacts 14 and closing holding contacts 24*a* and 24*b* from the $\phi 2$ line to the $A_n$ holding coil 6. It should be noted that the closing of the $A_n$ relay contacts does not occur simultaneously with the commencement of the $\phi 1$ pulse because a small increment of time is required for armature pull-in as illustrated in FIG. 2.

At the termination of the $\phi 1$ control signal, the $\phi 2$ signal begins and holds the $A_n$ relay energized through the holding path provided by the now closed holding contacts 24*a* and 24*b*. Relay $A_n$ is thus energized during $\phi 1$ and $\phi 2$, but the $A_n$ relay transfer contacts 14 which form the A operate paths are energized only during $\phi 2$. Since the A operate paths were switched during $\phi 1$ by the initial energization of the $A_n$ operating coil 4, and were energized only during $\phi 2$, it can be seen that dry-switching has been achieved with respect to the A operate paths.

The $B_n$ relay operating coil 4 is initially energized by a $\phi 2$ signal through an operate path provided by the holding contacts 24*a* and 24*b* on relay $A_n$. The energization of the $B_n$ relay operating coil 4 causes the armature (not shown) of the $B_n$ relay to pull-in thereby changing the state of the $B_n$ relay transfer contacts 16 and at the same time closing holding contacts 26*a* and 26*b* for the $B_n$ relay holding coil 6. The closing of the $B_n$ relay contacts does does not occur simultaneously with the commencement of $\phi 2$ because a finite time is required for armature pull-in as shown in the timing diagram of FIG. 2. When $\phi 2$ ends, the $B_n$ relay is held by $\phi 1$ signals through the now closed holding contacts 26*a* and 26*b*. If it is desired to continue the chain in this fashion, the $B_n$ relay may also close a contact from the $\phi 1$ line to a following A relay which in turn provides a $\phi 2$ energized operating path for a second B relay and so forth.

However, considering for a moment only the components shown in FIG. 1, if an input pulse is not present on line 20 when $\phi 2$ ends and $\phi 1$ begins again, the relay $A_n$ will drop-out during $\phi 1$ time, but the $B_n$ relay will hold through its $\phi 1$ energized holding contacts 26*a* and 26*b*. At the commencement of the next $\phi 2$ time, the $B_n$ relay will drop-out because the operate path provided by the $A_n$ relay holding contacts 24*a* and 24*b* is no longer closed as a result of $A_n$ relay drop-out during the preceding $\phi 1$ time. Thus by providing a circuit in which the A relays are constrained to operate from the $\phi 1$ line through operate paths provided by B relays and in which the B relays are constrained to operate from the $\phi 2$ line through A relay operate paths, neither A relay contacts nor B relay contacts are required to make or break a flowing current. All switching is therefore dry-switching is therefore dry-switching since A relays make and break $\phi 2$ paths during $\phi 1$ time and B relays make and break $\phi 1$ paths during $\phi 2$ time.

Turning now to the timing diagram depicted in FIG. 2, it can be seen that the input pulse corresponds to a full phase period, however, this is not a prerequisite of the dry-switching relay circuit. It is only necessary that the input pulse during one phase be sufficient to insure that the operated relay is closed at the commencement of the next phase. If the phase durations are long with respect to the operate or "pull-in" times of the A and B relays and nonsynchronous input pulses are to be sensed, then the operated relay must be held from the termination of the input pulse until the beginning of the next phase period.

Figures 3A, 10, 11:
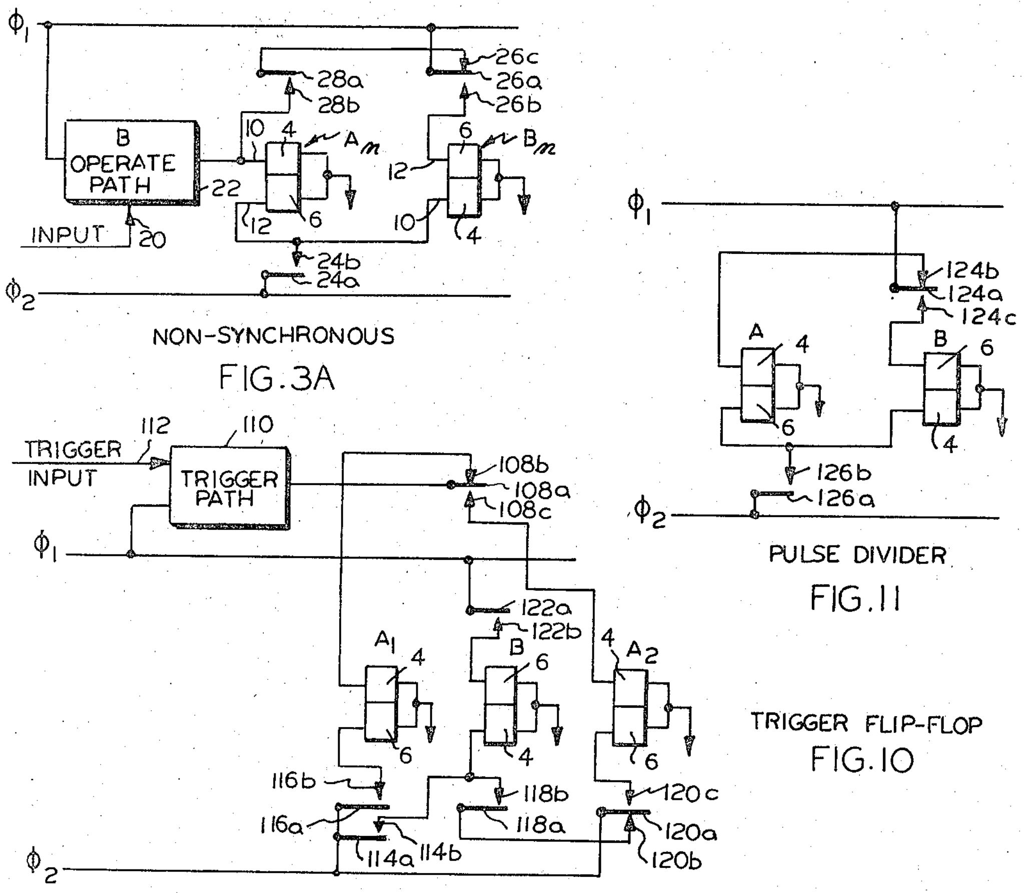
FIGS. 3A and 3B are block diagrams of a modified dry-switching relay circuit for use with nonsynchronous inputs.
FIG. 10 is a block diagram of a dry-switching relay trigger flip-flop.
FIG. 11 is a block diagram of a dry-switching relay pulse divider.
Figure 3B:
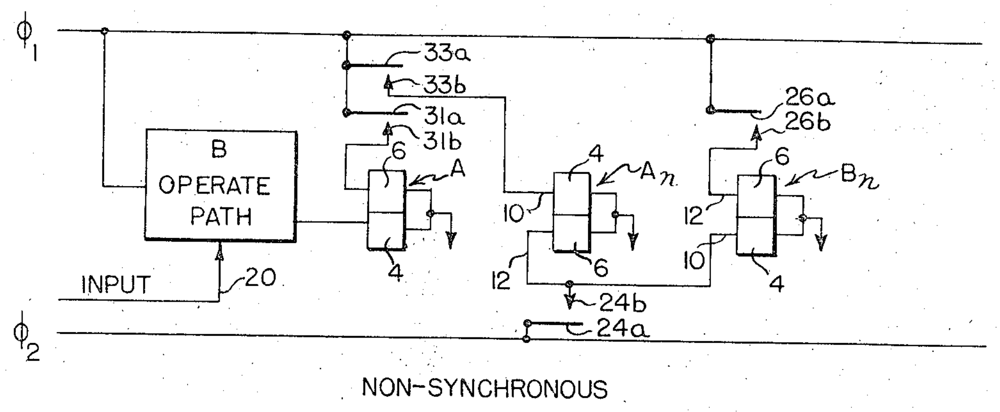

This can be accomplished by the relay circuits depicted in FIGS. 3A and 3B which are designed to provide dry-switching of the A and B operate paths in response to nonsynchronous input pulses. The selection of one or the other of the circuits shown in FIGS. 3A and 3B is dictated by the pattern of occurrences of the nonsynchronous events sensed by the switching circuits. If the input pulses on line 20 do not occur during two successive $\phi 1$ periods, as shown in the timing diagram of FIG. 4, then the circuit depicted in FIG. 3A will provide the desired dry-switching mode of operation. However, if two nonsynchronous events occur during two successive $\phi 1$ times, an additional $\phi 1$ energized latching path must be provided for the $A_n$ relay as shown in FIG. 3B and described below.

Figure 4:
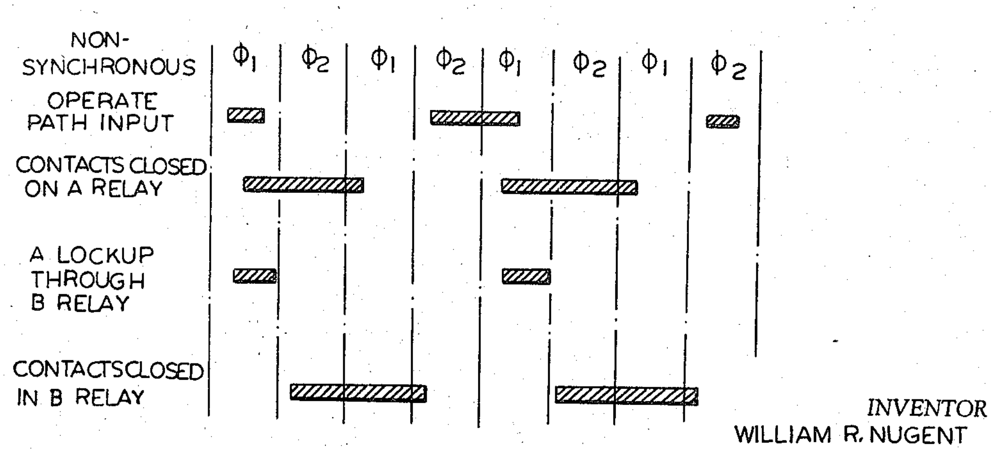
FIG. 4 is a timing diagram of the circuit shown in FIG. 3.

Referring first to the nonsynchronous dry-switching circuit depicted in FIG. 3A and the corresponding timing diagram shown in FIG. 4, it can be seen that although the $A_n$ relay B operate path 22 is closed by the nonsynchronous input on line 20 for only a portion of the $\phi 1$ time, the duration of the input pulse is sufficient to operatethe $A_n$ relay. The relationship between input pulse duration and phase duration is illustrated in the timing diagram of FIG. 4. Since the $A_n$ relay must be operated, i.e., energized, at the commencement of the next $\phi 2$ period, a $\phi 1$ lockup for the $A_n$ relay is provided by a back contact 26*c* on the following $B_n$ relay and the normally open contacts 28*a* and 28*b* on the $A_n$ relay. When the next $\phi 2$ period commences, the action is the same as previously described with regard to the synchronous input circuitry shown in FIG. 1.

It has already been pointed out that an additional latching path is required for the $A_n$ relay, as shown in FIG. 3B, to make this relay responsive to a nonsynchronous input which occurs during the next succeeding $\phi 1$ period after the previous nonsynchronous input pulse. The reason for the additional latching path for the $A_n$ relay will be apparent if one considers the operational sequence of the $A_n$ and $B_n$ relays depicted in previously described FIG. 3A. Referring to the timing diagram shown in FIG. 4, it can be seen that if a nonsynchronous input occurs during the second $\phi 1$ time, the $A_n$ relay will operate and will remain energized for the duration of the nonsynchronous input pulse. However, the $\phi 1$ lockup path provided by the $B_n$ relay contacts 26*a* and 26*c* is open because the $B_n$ relay is held at this time by $\phi 1$ signals through the path provided by $B_n$ relay contacts 26*a* and 26*b*. The additional $\phi 1$ energized latching path for the $A_n$ relay shown in FIG. 3B provides a $\phi 1$ energized path for the operating coil 4 of the $A_n$ relay so that the $A_n$ relay operating coil will remain energized until the commencement of the next $\phi 2$ period.

Looking now at FIG. 3B, it can be seen that a nonsynchronous input on line 20 during $\phi 1$ will close the $\phi 1$ energized B operate path 22 thereby energizing the operating coil 4 of the additional A relay. The energization of the additional A relay during $\phi 1$ time closes contacts 31*a*, 31*b* and 33*a*, 33*b*. The first pair of contacts establishes a $\phi 1$ energized holding path for the A relay holding coil 6 while the latter two contacts form a $\phi 1$ energized latching path for the operating coil 4 of the $A_n$ relay. With these paths established, if the nonsynchronous input pulse terminates before the commencement of the next $\phi 2$ period, the $A_n$ relay will remain operated by $\phi 1$ power through the closed contacts 33*a* and 33*b* on the additional A relay. When the next $\phi 2$ time commences, the additional A relay will drop out while the $A_n$ relay holds through contacts 24*a* and 24*b* which in turn provide a $\phi 2$ energized operate path for the $B_n$ relay operating coil 4. At the beginning of the next succeeding $\phi 1$ period, the $B_n$ relay holds through its own contacts 26*a* and 26*b* and the $A_n$ relay drops out. If another nonsynchronous input pulse appears on line 20 during this $\phi 1$ period, the above-described sequence will be repeated with contacts 33*a* and 33*b* on the additional A relay providing the $\phi 1$ energized latching path for the $A_n$ relay operating coil 4.

It should be noted that although the utilization means 18, the $A_n$ and $B_n$ relay transfer contacts 14 and 16, respectively and their associated A and B operate paths have been omitted from FIGS. 3A and 3B in order to emphasize the circuit modifications shown therein, these components form a part of the nonsynchronous dry-switching relay apparatus and function in the same manner as described previously with respect to FIG. 1.

Although the embodiments depicted in FIGS. 3A and 3B and discussed above demonstrate the general concepts and circuitry of the dry-switching relay apparatus, it should be understood that these embodiments are presented by way of illustration and that the invention is not limited to the particular circuit configurations shown therein. For example, since one of the objects of the invention is to provide dry-switching relay logic networks for combination and/or sequential logic, I will now describe a number of other preferred embodiments of the present invention which collectively comprise a dry-switching instrumentation of the normal logical functions with inexpensive, conventional relays. the dry-switching relay logic embodiments will be discussed hereinafter under the following general categories: Serial Delay Lines; Shift Registers; Flip-Flops; Pulse Dividers; Binary Counters; Full Adders; and, Single Pulse Generators.

*Serial delay lines*

It has already been mentioned that the dry-switching relay circuit depicted in FIG. 1 can be extended by adding alternate A and B relays. If this is done, the circuit in effect becomes a serial delay line actuated by an input pulse on line 20. It is often desirable, however, to have a delay line in which the pulse propagation can be initiated at any point along the line. The instrumentation of such a delay line is depicted in FIG. 5 wherein an input pulse on either input lines 30 or 32 will operate the associated A or B relay and all succeeding relays as the pulse travels down the line.

Figure 5:
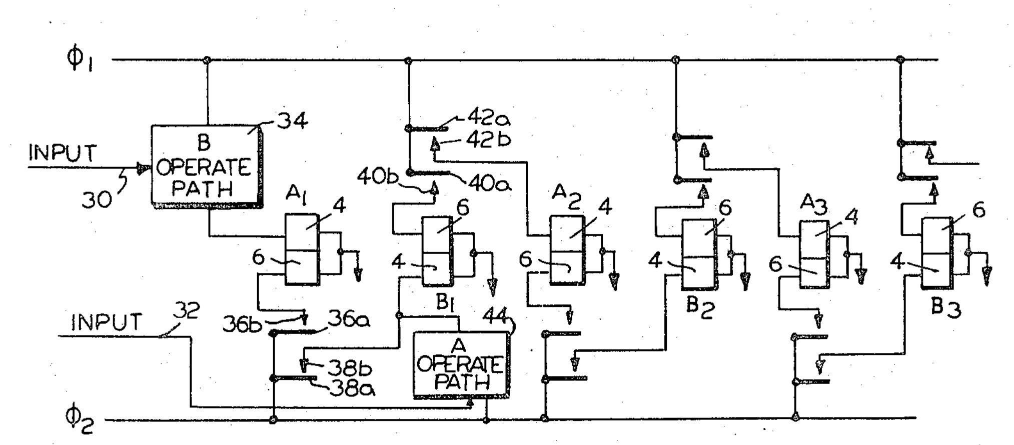
FIG. 5 is a block diagram of a dry-switching relay serial delay line.

It can be seen from an inspection of FIG. 5 that an input on line 30 during $\phi 1$ will provide a $\phi 1$ energized B operate path 34 for the operating coil 4 of relay $A_1$ and that the energization of relay $A_1$ establishes a $\phi 2$ energized holding path for the $A_1$ relay holding coil 6 through holding contacts 36*a* and 36*b*. At the same time, contacts 38*a* and 38*b* on relay $A_1$ provide a $\phi 2$ energized operate path for the $B_1$ relay operating coil 4 so that when $\phi 2$ begins the $A_1$ relay is held through contacts 36*a* and 36*b* while the $B_1$ relay is operated through contacts 38*a* and 38*b*.

The energization of relay $B_1$ closes $B_1$ contacts 40*a*, 40*b*, 42*a* and 42*b* which provide, respectively, a $\phi 1$ energized holding path for the $B_1$ holding coil 6 and a $\phi 1$ energized operate path for the operating coil 4 of the next succeeding A relay, i.e., $A_2$. At the commencement of the next $\phi 1$ time, the operating coil 4 of relay $A_2$ is energized and the cycle repeats itself with each relay being energized for two successive phase times as the pulse travels down the delay line.

The pulse propagation can also be started at relay $B_1$ by applying an input pulse to line 32 during $\phi 2$. The input pulse completes a $\phi 2$ energized A operate path 44 for the $B_1$ relay operating coil 4 thereby initiating the pulse propagation at the second i.e., $B_1$ relay. It will now be apparent that each relay can be provided with a separate input line and an associated A or B operate path to permit the initiation of the pulse propagation at any point along the line. However, if pulse propagation is always initiated at the first relay, then only one contact per relay is needed instead of the two contacts shown in FIG. 5. In this situation, the serial delay line would merely be an extension of the circuitry shown in FIG. 1.

Utilization means 18, relay transfer contacts 14 and 16 and the corresponding A and B operate paths have been omitted from FIG. 5 for purposes of clarity. Since those skilled in the art will readily appreciate that the delay line does not operate in vacuo, it is believed that this omission will not affect an understanding of this embodiment of the invention.

*Shift register*

Figure 6:
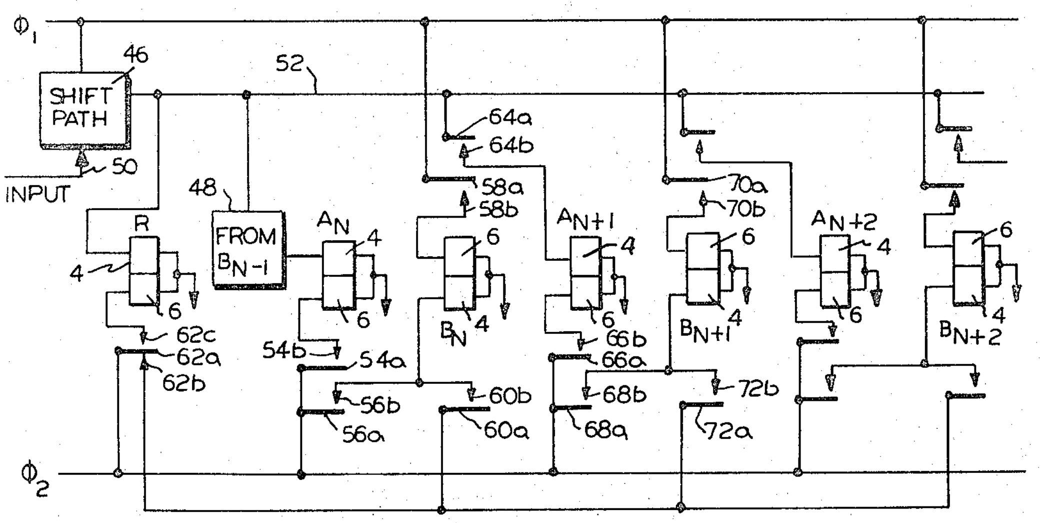
FIG. 6 is a block diagram of a dry-switching relay shift register.

The use of separate relay contacts for the holding of an operated relay and for the operation of the next succeeding relay, as shown in the serial delay line of FIG. 5, is also a feature of the dry-switching relay shift register depicted in FIG. 6. The shift register has a plurality of sequentially alternating A and B relays identified as $A_n$ through $A_{n+2}$ and $B_n$ through $B_{n+2}$. The chain of sequentially alternating A and B relays can be extended to provide any number of desired stages in the shift register. In this circuit, relay $A_n$ has its operating coil 4 energized by $\phi 1$ control signals through a normally open shift path 46 and an operating path 48 provided by the previous B relay i.e., $B_{n-1}$. The shift path 46 is closed by a shift input on line 50. If the shift input occurs during $\phi 1$, shift line 52 will be energized by the $\phi 1$ control signal through the closed shift path 46. Assuming that a shift input does occur during $\phi 1$ and, further, that the operating path 48 is closed by relay $B_{n-1}$, then relay $A_n$ will operate during $\phi 1$ time and hold during the next $\phi 2$ time through a $\phi 2$ energized holding path provided by holding contacts 54*a* and 54*b*. The energization of relay $A_n$ also provides a $\phi 2$ energized operate path for relay $B_n$ through normally open contacts 56*a* and 56*b* on the $A_n$ relay. If the shift path 46 and the operate path 48 of relay $A_n$ are open during this $\phi 2$ time, at the commencement of the next $\phi 1$ time relay $A_n$ will drop out, but relay $B_n$ will continue to hold via alternate $\phi 1$ and $\phi 2$ pulses through its own contacts 58*a*, 58*b* and 60*a*, 60*b*, respectively, and the $\phi 2$ energized contacts 62*a*, 62*b* on shift relay R. The energization of relay $B_n$ also closes normally open $B_n$ relay contacts 64*a* and 64*b* which complete an operate path from the shift line 52 to the operating coil 4 of relay $A_{n+1}$.

When the next shift input appears on line 50 during $\phi 1$, shift relay R is energized by $\phi 1$ power through shift path 46. The shift relay R is similar to the A and B relays and is called an R relay only to facilitate the identification of the various relays. The energization of shift relay R removes the $\phi 2$ energized latching path provided by contacts 62*a* and 62*b* from all of the B relays. Note, however, that at the time the shift relay R is energized, relay $A_{n+1}$ is also energized by $\phi 1$ power through contacts 64*a* and 64*b* on the preceding $B_n$ relay. Thus, during the following $\phi 2$ time, shift relay R will remain energized through a holding path provided by contacts 62*a* and 62*c*, relay $B_n$ will drop out, relay $A_{n+1}$ will hold through a $\phi 2$ energized holding path provided by contacts 66*a* and 66*b* and provide a $\phi 2$ energized operate path for the operating coil 4 of relay $B_{n+1}$ through its normally open contacts 68*a* and 68*b*. At the commencement of the next $\phi 1$ time, shift relay R will drop out if no shift pulse is present on the shift input line 50. Relay $A_{n+1}$ will also drop out leaving relay $B_{n+1}$ holding on alternate phases through its own contacts 70*a*, 70*b* and 72*a*, 72*b* and the now closed contacts 62*a* and 62*b* on shift relay R.

It will be appreciated by those skilled in the art that the shift register depicted in FIG. 6 can perform a periodic shifting in a dry-switching mode of operation. Furthermore, it will be aparent that although the appropriate A and B relay transfer contacts, associated operate paths and utilization means are not shown in FIG. 6 in the interests of clarity, these components provide a readout of the shift register.

*Flip-flops*

Figure 8:
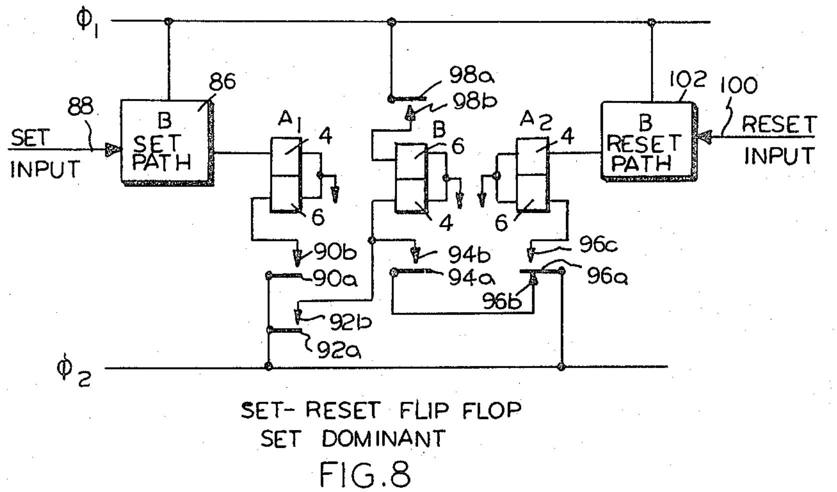
FIG. 8 is a block diagram of a dry-switching relay set-reset flip-flop, set dominant.
Figures 7, 9:
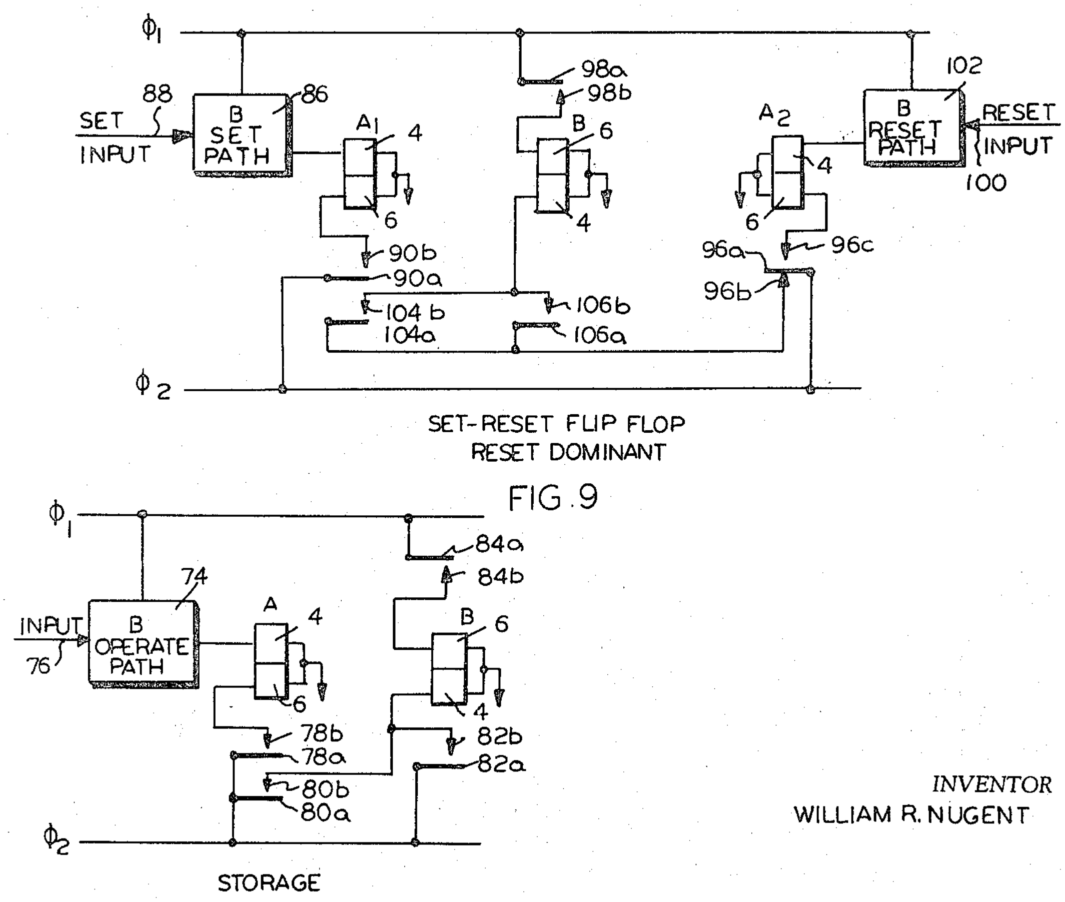
FIG. 7 is a block diagram of a dry-switching relay storage circuit.
FIG. 9 is a block diagram of a dry-switching relay set-reset flip-flop, reset dominant circuit.

The flip-flop embodiments depicted in FIGS. 8, 9 and 10 each have an $A_1$ relay and a B relay which function as the SET and STORAGE relays, respectively, and an $A_2$ relay which performs the RESET function. Since all of the flip-flop circuits include a storage element, the basic dry-switching relay storage circuit shown in FIG. 7 will be discussed before examining the set-reset, flip-flop circuits of FIGS. 8 and 9 and the trigger flip-flop shown in FIG. 10.

Referring to FIG. 7, a B operate path 74 is provided for the A relay operating coil 4 whenever an input pulse appears on line 76. If the input pulse occurs during $\phi 1$, the A relay is energized thereby closing A relay holding contacts 78*a* and 78*b* and contacts 80*a* and 80*b* which provide a $\phi 2$ energized operate path for the B relay operating coil 4. During the following $\phi 2$, the A relay holds and the B relay operates closing B relay contacts 82*a* and 82*b* to provide a $\phi 2$ energized latching path for the B relay operating coil 4. The energization of the B relay also provides a $\phi 1$ holding path for the B relay holding coil 6 through the B relay contacts 84*a* and 84*b*. Thus, when $\phi 2$ ends and the next $\phi 1$ begins, the A relay drops out while the B relay continues to hold through its own contacts on subsequent $\phi 1$ and 2 pulses. In order to erase the storage contained in the B relay, the B relay latching path through contacts 82*a* and 82*b* can be broken during $\phi 2$ or the holding path through contacts 84*a* and 84*b* can be interrupted during $\phi 1$.

If another relay is used to break the latching path to the B relay operating coil 4, the circuit becomes a set-reset, flip-flop with the additional relay providing the reset function. This is illustrated in FIG. 8 wherein relays $A_1$ and $A_2$ perform the SET and RESET operations, respectively, while the relay B functions as the storage element. The $A_1$ relay operating coil 4 is energized by $\phi 1$ signals through a B set path 86 whenever a SET pulse appears on line 88 during $\phi 1$ time. The energization of the SET relay $A_1$ closes holding contacts 90*a* and 90*b* and provides a $\phi 2$ energized operate path for the operating coil 4 of the STORAGE relay B through contacts 92*a* and 92*b* on relay $A_1$. At the commencement of the next $\phi 2$ time, the SET relay $A_1$ will hold and the STORAGE relay B will be operated by $\phi 2$ pulses through the path provided by contacts 92*a* and 92*b*. The energization of the STORAGE relay B during $\phi 2$ establishes a $\phi 2$ energized latching path for the STORAGE relay operating coil 4 through its own contacts 94*a* and 94*b* and contacts 96*a* and 96*b* on the RESET relay $A_2$. In addition, the operation of the STORAGE relay B also closes normally open holding contacts 98*a* and 98*b* which provides a $\phi 1$ energized holding path for the STORAGE relay holding coil 6. During the next $\phi 1$ time, the SET relay $A_1$ will drop out while the STORAGE relay B continues to hold during $\phi 1$ and 2 as a result of the holding path provided by contacts 98*a* and 98*b* and the latching path provided by contacts 94*a*, 94*b*, 96*a* and 96*b*.

The flip-flop circuit shown in FIG. 8 can be reset by applying a RESET pulse to line 100 during $\phi 1$. The RESET pulse closes B reset path 102 thereby supplying a $\phi 1$ power to the RESET relay $A_2$ operating coil 4. The energization of the RESET relay $A_2$ removes the $\phi 2$ energized latching from the STORAGE relay operating coil 4 by opening RESET relay transfer contacts 96*a* and 96*b*. At the same time, the center contact 96*a* completes a holding path for the RESET relay holding coil 6 through contact 96*c*. At the beginning of the next $\phi 2$, the STORAGE relay B drops out while the RESET relay $A_2$ holds through contacts 96*a* and 96*c*. During the next $\phi 1$, the RESET relay $A_2$ will drop out leaving the set-reset, flip-flop circuit ready to receive the next SET input pulse on line 88.

The flip-flop depicted in FIG. 8 is set-dominant because the simultaneous application of SET and RESET pulses on lines 88 and 100, respectively, will cause the relay to set. If a reset-dominant mode is desired, the flip-flop circuit can be modified as shown in FIG. 9. In this circuit, the energization of the STORAGE relay B is controlled entirely by the RESET relay $A_2$. If the RESET relay is de-energized, as shown in FIG. 9, the transfer contacts 96*a* and 96*b* will provide a $\phi 2$ energized path for the STORAGE relay operating coil 4 either through the operate contacts 104*a* and 104*b* or the latching contacts 106*a* and 106*b*. However, if simultaneous SET and RESET pulses are applied to input lines 88 and 100, respectively, during $\phi 1$, the reset relay $A_2$ will operate thereby opening contacts 96*a* and 96*b* and completing a $\phi 2$ holding path for the RESET relay holding coil 6 through contacts 96*a* and 96*c*. Since the STORAGE relay B can never be energized on the next succeeding $\phi 2$ signal under these conditions, the dry-switching flip-flop circuit of FIG. 9 thus produces a reset-dominant mode of operation.

Another type of flip-flop circuit is shown in FIG. 10 wherein a trigger flip-flop is achieved by means of a SET relay $A_1$ and a RESET relay $A_2$ which are initially energized through a transfer contact 108 on the STORAGE relay B. The circuitry and functions of the SET, STORAGE and RESET relays $A_1$, B and $A_2$, respectively, are identical to the corresponding relays of the set-reset, flip-flop circuit shown in FIG. 8 with the exception of the aforementioned operation of the SET and RESET relays through the STORAGE relay transfer contact 108. The center transfer contact 108*a* sends a $\phi 1$ pulse to either the SET or RESET relay operating coils 4 whenever trigger path 110 is closed during $\phi 1$ by a trigger input on line 112. If the STORAGE relay B is de-energized when the trigger input occurs during $\phi 1$, the SET relay $A_1$ operating coil 4 will be energized by $\phi 1$ power through contacts 108*a* and 108*b*. During the next $\phi 2$ time, the STORAGE relay B is energized by $\phi 2$ power through contacts 114*a* and 114*b* while the SET relay $A_1$ holds through contacts 116*a* and 116*b*. The $\phi 2$ latching path for the STORAGE relay operating coil 4 provided by contacts 118*a*, 118*b*, 120*a* and 120*b* and the $\phi 1$ holding path provided by contacts 122*a* and 122*b* are identical with the STORAGE relay latching and holding paths described previously with respect to FIG. 8. The STORAGE relay will therefore continue to hold during alternate $\phi 1$ and $\phi 2$ pulses. When the next trigger input occurs during $\phi 1$, the $\phi 1$ pulse is applied to the operating coil 4 of the RESET relay $A_2$ through transfer contacts 108*a* and 108*c*. The energization of the RESET relay $A_2$ breaks the $\phi 2$ energized latching path for the STORAGE relay and provides a $\phi 2$ energized holding path through contacts 120*a* and 120*c* for the RESET relay holding coil 6. During the next $\phi 2$, the STORAGE relay drops out and the trigger flip-flop is reset for the next trigger input which will set the flip-flop.

It should be understood that in all of the preceding flip-flop circuits, the energization state of the relays can be sensed by coupling suitable utilization means to the respective relays through operate paths provided by one or sets of transfer contacts. Since these elements have already been shown in connection with the basic dry-switching embodiment, they have been omitted from the above-described figures for purposes of clarity.

*Pulse dividers*

A dry-switching pulse divider or oscillator is shown in FIG. 11. The pulse divider has an A and a B relay interconnected so that the A relay will operate on every other $\phi 1$ pulse and remain operated for the following $\phi 2$. The operational states of the A and B relays are represented by the position of A and B relay transfer contacts and the energization of their associated operate paths. These components and an appropriate utilization means have not been shown in FIG. 11 because their use has been illustrated previously with regard to the embodiment depicted in FIG. 1.

The sequence of operation of the pulse divider commences with a $\phi 1$ pulse energizing the operating coil 4 of the A relay through normally closed transfer contacts 124*a* and 124*b* on the B relay. The energization of the A relay closes contacts 126*a* and 126*b* which provide a $\phi 2$ energized holding path for the A relay holding coil 6 and an operate path for the B relay operating coil 4. During the next $\phi 2$, the A relay holds while the B relay operates thereby breaking the $\phi 1$ energized operate path for the A relay operating coil 4 and at the same time creating a holding path through transfer contacts 124*a* and 124*c* for the B relay holding coil 6. Since the $\phi 1$ energized operating path for the A relay operating coil 4 has been broken, the next $\phi 1$ pulse will hold the B relay but not operate the A relay. When the next $\phi 2$ begins, the B relay will drop out because the de-energization of the A relay opens the $\phi 2$ operate path for the B relay provided by contacts 126*a* and 126*b*. At this point the pulse divider is ready to recycle and the next $\phi 1$ pulse will operate the A relay.

It will be readily apparent to those skilled in the art that the input to output pulse ratio, in this case 2:1, can be altered by using additional relays to inactivate the operating path for the A relay operating coil 4 for the desired number of $\phi 1$ periods.

*Binary counters*

Figure 12:
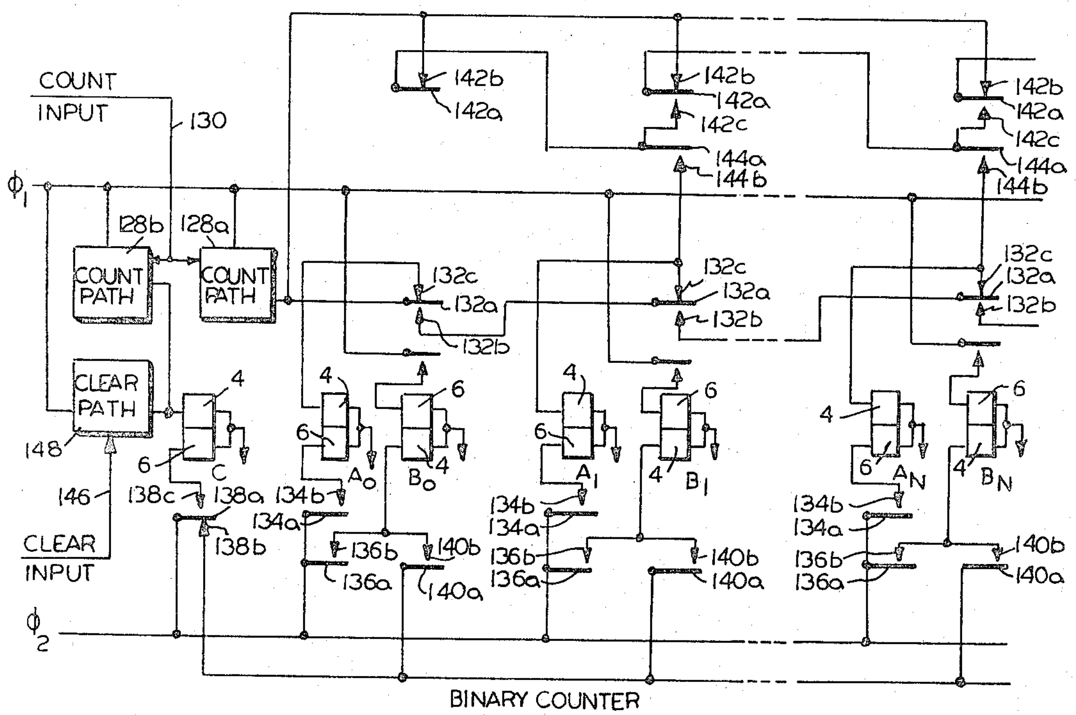
FIG. 12 is a block diagram of a dry-switching relay binary counter.

Another embodiment of the invention is shown in FIG. 12 wherein a plurality of conventional relays are interconnected to form a dry-switching binary counter. The operation of the dry-switching binary counter can best be understood by examining FIG. 12 in conjunction with the following discussion of the circuitry shown therein. It should be noted that while many of the relay operations described hereinafter have no exact counterpart in conventional semiconductor computers, the actual counting operations of both the relay and semiconductor computers are identical.

The binary counter has a plurality of counting stages, indicated as $A_0$–$B_0$ through $A_n$–$B_n$, whose energization states represent collectively the binary count of the dry-switching counter. Each counting stage comprises a pair of A and B relays with the B relay holding the present count of the stage. Assuming that count path 128*a* is closed during $\phi 1$ by a count input on line 130, then the $\phi 1$ signal will be sent as a probe through B relay contacts 132*a* and 132*b*. When the $\phi 1$ pulse reaches the first de-energized B relay, i.e., the least significant ZERO, the $\phi 1$ pulse energizes the same stage A relay through contacts 132*a* and 132*c* on the B relay. During the next $\phi 2$, the A relay holds through A relay contacts 134*a* and 134*b* while the B relay operating coil 4 is energized through another set of A relay contacts 136*a* and 136*b*. The count of the least significant ZERO stage thus changes to ONE at the commencement of the next $\phi 2$ time following the initial $\phi 1$ count pulse.

During the same $\phi 2$ time, the lesser significant stages which hold a count of ONE, are complemented by removing a $\phi 2$ energized latching path from the B relays. The complementing of the lesser significant stages is accomplished by the action of a clear relay C. The clear relay C is similar to the A and B relays and is identified as a C relay only to facilitate the description of the various relays. Note that during the preceding $\phi 1$ time, the clear relay C operating coil 4 was energized by the $\phi 1$ pulse through the count path 128*b*. The energization of relay C breaks the $\phi 2$ latching path for the B relays provided by C relay contacts 138*a* and 138*b* and the B relay contacts 140*a* and 140*b*. At the same time, the energization of relay C also establishes a $\phi 2$ holding path through contacts 138*a* and 138*c* for the C relay holding coil 6. Thus when the next $\phi 2$ commences, the less significant B relays will drop out while the least significant ZERO B relay is made ONE as described above.

The more significant ONE stages have their associated A relays operated during $\phi 1$ time by $\phi 1$ signals through the preceding stage B relay contacts 142*a* and 142*b* and the same stage B relay contacts 144*a* and 144*b* so that the corresponding B relays will retain their count during the next $\phi 2$ period despite the breaking of the common $\phi 2$ latching path through the clear relay C contacts 138*a* and 138*b*. It should be noted that any particular stage A relay will be energized through B relay contacts 142*a*, 142*b*, 144*a* and 144*b* only if the preceding stage holds a count of ZERO.

The dry-switching binary counter shown in FIG. 12 can be cleared by applying a clear input pulse to line 146 during $\phi 1$. The clear input pulse closes a clear path 148 which supplies the $\phi 1$ pulse to the clear relay C operating coil 4 causing the relay to operate during $\phi 1$. The clear relay C remains operated during $\phi 2$ thus removing the common $\phi 2$ latching path from all of the B relays.

Figure 13:
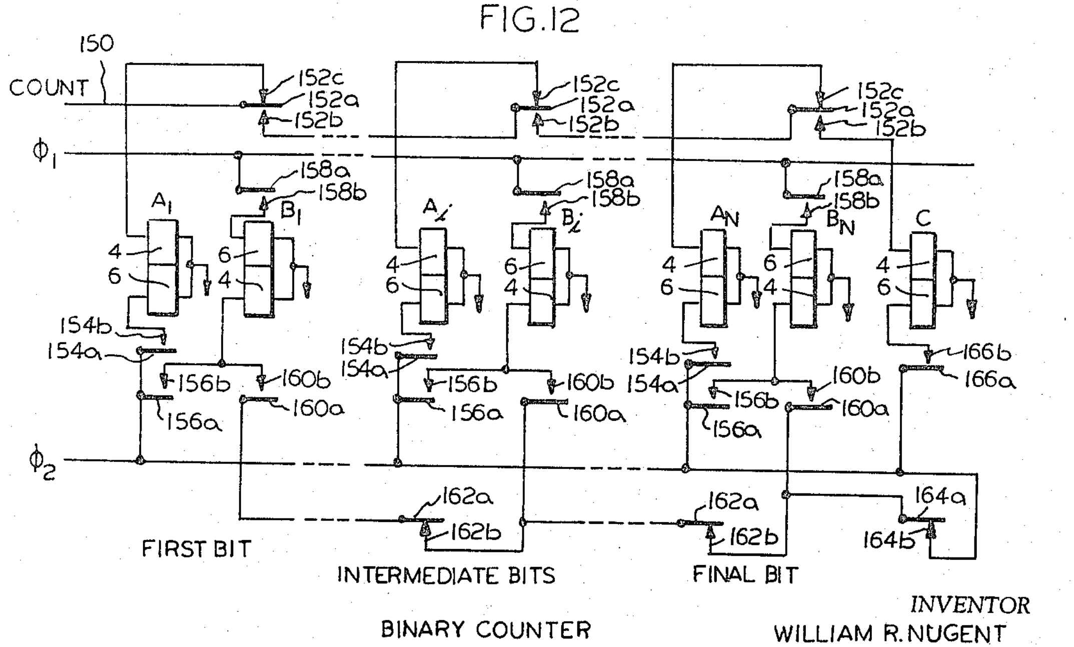
FIG. 13 is a block diagram of another embodiment of the dry-switching relay binary counter.

A somewhat different version of the dry-switching relay binary counter is depicted in FIG. 13. The individual counting stages of the binary counter each have a pair of A and B relays which are identified in FIG. 13 as $A_1$–$B_1$, $A_i$–$B_i$ and $A_n$–$B_n$. The subscripts 1, *i* and *n* represent the binary digits held by the stage i.e., the first bit, the intermediate bits and the final bit, respectively. The B relays in each stage hold the count of the stage as previously described with regard to the binary counter shown in FIG. 12.

Looking now at FIG. 13, the binary counter is actuated by the $\phi 1$ count pulse on line 150 which probes the B relay contacts 152*a* and 152*b* to find the least significant ZERO stage i.e., the first de-energized B relay, and operates the associated A relay through contacts 152*a* and 152*c*. Assuming that the $B_1$ stage holds the least significant ZERO count, then the $\phi 1$ count pulse will actuate relay $A_1$ through contacts 152*a* and 152*c* on relay $B_1$. The energization of relay $A_1$ forms a $\phi 2$ energized holding path for the $A_1$ relay holding coil 6 through $A_1$ relay contacts 154*a* and 154*b* and, in addition, completes a $\phi 2$ energized operate path for the $B_1$ relay operating coil 4 through contacts 156*a* and 156*b*. During the next $\phi 2$ time, relay $A_1$ holds and $B_1$ relay operates thus making the least significant ZERO stage a ONE.

The $B_1$ relay, which now holds a count of ONE, remains energized during the next succeeding $\phi 1$ time through its closed holding contacts 158*a* and 158*b*. During the next following $\phi 2$ period, the $B_1$ relay continues to operate through a $\phi 2$ energized latching path provided by its own contacts 160*a* and 160*b*, by contacts 162*a* and 162*b* on all succeeding A relays and by contacts 164*a* and 164*b* on a clear relay C. The first bit stage $A_1$–$B_1$ will thus continue to hold during alternate $\phi 1$ and $\phi 2$ periods until the arrival of the next count pulse.

When the next count pulse arrives on line 150 during $\phi 1$, the pulse will probe the B relay contacts 152*a* and 152B. Since the $B_1$ relay now holds a count of ONE i.e., is energized, the count pulse is sent through $B_1$ contacts 152*a* and 152*b* and $B_i$ contacts 152*a* and 152*b* to the intermediate stage relay $A_i$. The energization of relay $A_i$ forms a $\phi 2$ energized holding path for relay $A_i$ and $\phi 2$ energized operate path for the $B_i$ relay operating coil 4 as described previously. Note that the operation of relay $A_i$ interrupts the P2 energized latching path provided by $A_i$ contacts 162*a* and 162*b* for all preceding or lesser significant stages. Thus, when the next $\phi 2$ period begins, all of the lesser significant stages are complemented while the least significant ZERO stage i.e., $B_i$, is made ONE. Although only one intermediate stage, $A_i$–$B_i$, has been shown in FIG. 13, it should be understood that the more significant ONE stages, including the other succeeding intermediate stages and the final stage, will retain a $\phi 2$ latching path through their own B relay contacts 160*a* and 160*b*.

When all stages hold a count of ONE, the next count impulse is sent to the clear relay C and energizes the operating coil 4 of this relay. The energization of clear relay C during $\phi 1$ creates a $\phi 2$ energized holding path for the C relay holding coil 6 through C relay contacts 166*a* and 166*b* and breaks the $\phi 2$ energized B relay latching path provided by C relay contacts 164*a* and 164*b*. When the next $\phi 2$ period occurs, the ONE relays will drop out thus resetting all stages to a ZERO count.

Figure 14:
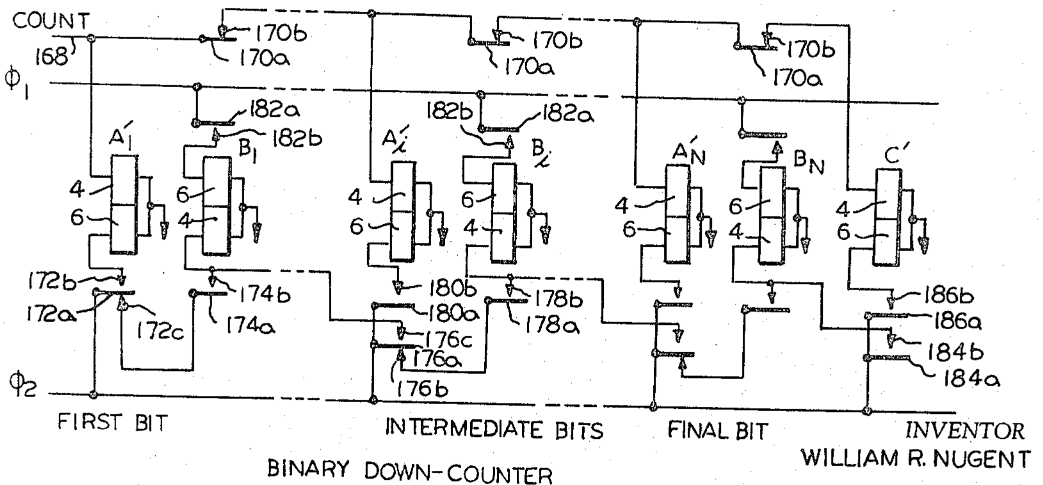
FIG. 14 is a block diagram of a dry-switching relay binary down-counter.

The same principles of dry-switching can be applied to binary counters that count down as well as in other patterns. A dry-switching binary down-counter is depicted in FIG. 14. The elements of the binary down-counter are identified by the same nomenclature as shown in FIG. 13 with the exception that the A relays now have a prime mark to signify a "down-count" A relay. As before, the B relays hold the count of the stage, however, the functions of the A and A′ relays are qiute different. The energization of an A′ relay releases the associated B relay during $\phi 2$ and operates the previous B relay whereas the operation of an A relay in FIG. 13 operates the associated B relay and releases all previous B relays.

Referring now to FIG. 13 when a count input appears on line 168 during $\phi 1$, relay $A'_1$ is operated and all other A′ relays up to and including the least significant ONE stage A′ relay are operated through contacts **170*a* and 170*b* on the associated B relays. For example, if the first bit is ZERO and the intermediate bit is ONE, then an input pulse on line 168 will operate the intermediate bit relay $A'_i$ in addition to relay $A'_1$. Turning first to the action of the $A'_1$ relay, it can be seen that the energization of relay $A'_1$ completes a $\phi 2$ energized holding path for the $A'_1$ holding coil 6 through $A_1$ contacts 172*a* and 172*b*. If relay $B_1$ was energized i.e., holding a count of ONE, then the energization of relay $A'_1$ would remove the $\phi 2$ energized operate path for the $B_1$ operating coil 4 provided by $B_1$ contacts 174*a* and 174*b* and by contacts 172*a* and 172*c*** on relay $A'_1$.

As noted above, the count input pulse during $\phi 1$ also energizes the operating coil 4 of relay $A'_i$. The energization of relay $A'_i$ breaks the $\phi 2$ energized operate path for the $B_i$ relay operating coil 4 provided by $A'_i$ relay contacts **176*a* and 176*b* and $B_i$ relay contacts 178*a* and 178*b*. The center contact 176*a* now completes a $\phi 2$ energized path to the preceding stage B relay i.e., $B_1$ through $A'_i$ relay contact 176*c*. At the commencement of the next $\phi 2$ period, relay $A'_i$ holds through its own contacts 180*a* and 180*b*, relay $B_i$ drops out i.e., is made ZERO, and the preceding stage relay $B_1$ is made ONE. During the following $\phi 1$ period, the energized B relays continue to hold through their own $\phi 1$ energized holding contacts 182*a* and 182*b*. The associated A′ relays, however, now drop out in the absence of another count pulse on line 168. With the associated A′ relays now de-energized, the $\phi 2$ operate paths for the B relay operating coils 4 are once again established through the A′ relays. The B relays which have a count of ONE will therefore continue to hold during alternate $\phi 1$ and 2 periods until the arrival of another count pulse on line 168**.

If all stages have a ZERO count, relay C′ is used to initiate the down-count by energizing relay $B_n$ through C′ relay contacts **184*a* and 184*b*. Holding contacts 186*a* and 186*b*** are also provided on the C′ relay to hold the C′ relay energized during $\phi 2$.

It can be seen from an inspection of the binary counters depicted in FIGS. 13 and 14 that $2N+1$ relays are required to instrument an N-bit dry-switching relay counter. If the circuits of FIGS. 13 and 14 are combined to produce an "up-down" or bidirectional counter, as depicted in FIG. 15, then $3N+2$ relays must be used.

Figure 15:
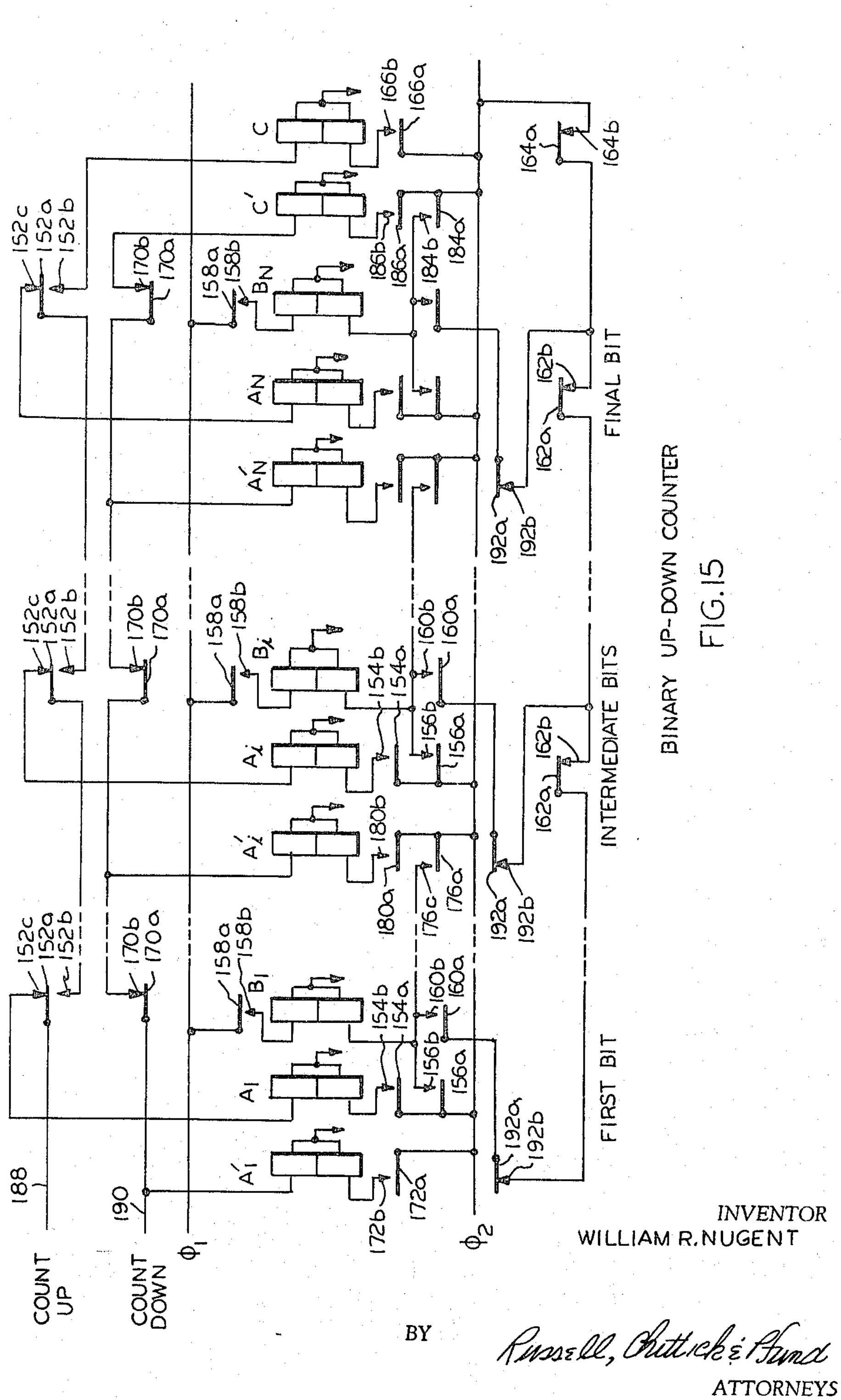
FIG. 15 is a block diagram of a dry-switching relay binary up-down counter.

The dry-switching relay binary up-down counter shown in FIG. 15 is essentially a combination of the individual counters depicted in FIGS. 13 and 14 with certain minor changes hereinafter enumerated. The same relay nomenclature and contact numbering has been employed in FIG. 15 to illustrate the similarities between the combined circuit of FIG. 15 and the individual circuits of FIGS. 13 and 14. The counting operations of the binary up-down counter are performed in the same manner as described previously with respect to the individual counters of FIGS. 13 and 14. The B relays hold the count of the particular stage while the A relays are used for "counter-up" and the A′ relays are used for "count-down."

The count pulses for the binary up-down counter occur during $\phi 1$ time and may appear on either the count-up line 188 or the count-down line 190. The sequential operation of the A and B relays in response to a count-up signal and the down-count initiated actions of the A′ and B relays have already been explained with regard to FIGS. 13 and 14, respectively, and therefore will not be repeated.

The minor changes in the combined up-down counter depicted in FIG. 15 relate to the $\phi 2$ latching path for the B relays. Referring for a moment to the down-counter shown in FIG. 14, it can be seen that the $\phi 2$ energized latching path for each B relay is controlled entirely by the energization state of the next succeeding A′ relay. Observe, however, that in FIG. 15, the ultimate control of the $\phi 2$ energized B relay latching path resides in the clear relay C. In order to achieve this control, a separate set of contacts **192*a* and 192*b*** has been provided on each of the A′ relays to establish a $\phi 2$ energized latching path for the corresponding B relay. Aside from these minor changes, the binary up-down counter depicted in FIG. 15 represents a combination of the previously described circuits depicted in FIGS. 13 and 14.

From the foregoing description of the binary counter embodiments of the present invention, it will be readily apparent to those skilled in the art that appropriate readout means can be provided to sense the energization states of the B relays which hold the count of each stage. This can be accomplished by providing one or more additional transfer contacts on each B relay. The B relay transfer contacts establish operate paths which are coupled to the utilization means as previously described.

*Full adders*

Figure 16:
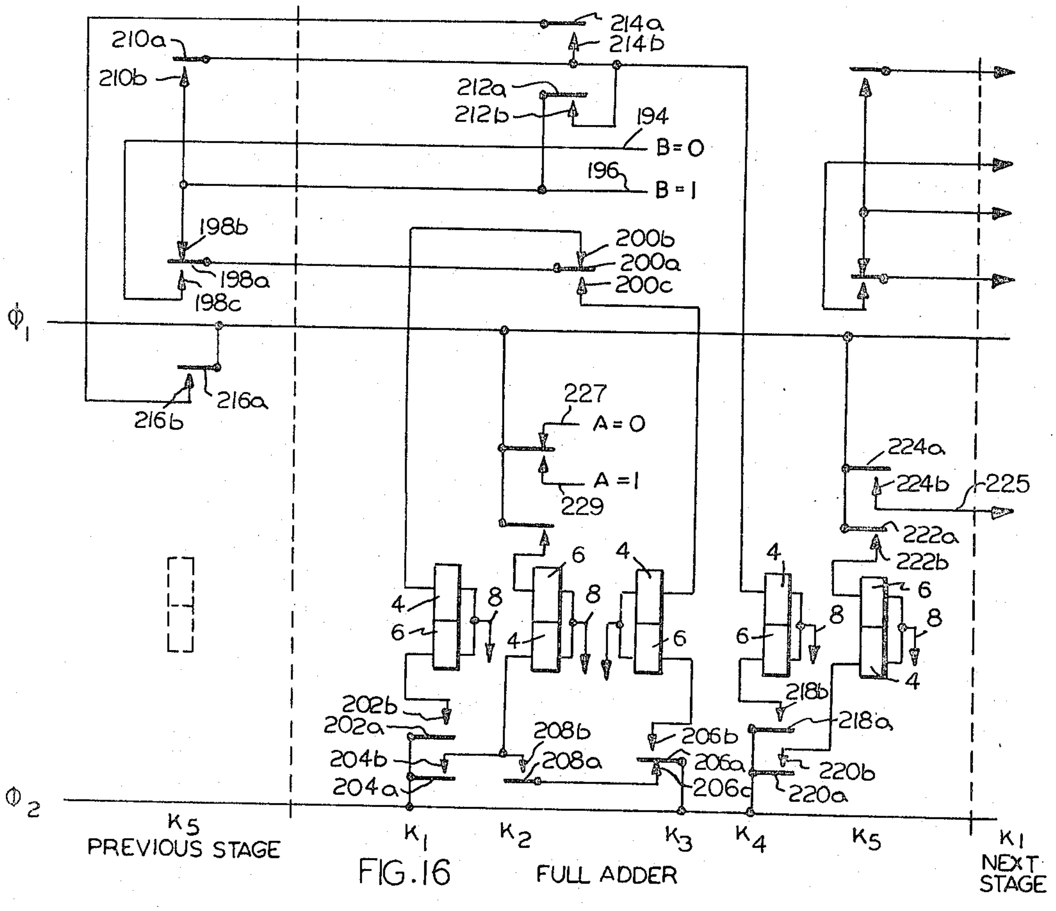
FIG. 16 is a block diagram of a dry-switching relay full adder.

A dry-switching full adder can be instrumented with conventional relays, as shown in FIG. 16, by combining one stage of the dry-switching shift register (FIG. 6) with the trigger flip-flop circuit depicted in FIG. 10. A different relay nomenclature has been used in FIG. 16 in order to distinguish between the dry-switching relays and the binary digits which are identified as A and B. Thus, instead of referring to the switching relays as A and B relays, the relays are now designated as $K_1$ through $K_5$, although it should be understood that the K relays correspond to the respective A and B relays shown in FIGS. 6 and 10.

Relays $K_1$, $K_2$ and $K_3$ constitute the trigger flip-flop portion of the full adder while relays $K_4$ and $K_5$ collectively comprise a single stage shift register. The binary digit A is held by the center relay $K_2$ of the trigger flip-flop. The other binary digit B is presented during a $\phi 1$ period on one of the adder input leads 194 and 196. The notation "$B=0$" indicates that a ground or negative pulse will be present on line 194 during $\phi 1$ time if B has a logic value of 0. Similarly, the term "$B=1$" indicates that another ground or negative pulse will be present on line 196 during $\phi 1$ time if B has a logic value of 1. The terms "ground" and "negative" are, of course, relative and as used herein are measured with respect to the potential on line 8 of each relay.

The operations performed by the full adder relays $K_1$, $K_2$ and $K_3$ are very similar, albeit not identical, to the "set," "storage" and "reset" functions of the corresponding relays depicted in the trigger flip-flop circuit of FIG. 10. This can be illustrated by examining the sequence of operations performed by each relay for given logic values of bits A and B. Assume that $B=1$, $A=0$ and no carry $Ci$ from the previous stage exists i.e., the previous stage relay $K_5$ is de-energized. Under these conditions, the flip-flop of the full adder will be triggered through the previous stage $K_5$ contacts **198*a* and 198*b* and $K_2$ relay contacts 200*a* and 200*b*. When the "set" relay $K_1$ operates, it establishes its own $\phi 2$ energized holding circuit through contacts 202*a* and 202*b* and at the same time forms a $\phi 2$ energized operate path through contacts 204*a* and 204*b* for the operating coil 4 of "storage" relay $K_2$. At the beginning of the next $\phi 2$ time, relay $K_2$ operates and forms its own $\phi 1$ energized holding path through contacts 202*a* and 202*b* while relay $K_1$ holds through the previously established $\phi 2$ energized holding path provided by contacts 202*a* and 202*b*. When the next $\phi 1$ period begins, relay $K_2$ holds and remains energized during succeeding $\phi 1$ and $\phi 2$ periods until the arrival of the next $B=1$ pulse on input line 196**.

Since relay $K_2$ is now energized, that is, $A=1$, it can be seen that grounding the input line 196 during a $\phi 1$ period will cause the "reset" relay $K_3$ to operate via $K_2$ relay contacts 200$a$ and 200$c$. The energization of relay $K_3$ establishes a $\phi 2$ energized holding path for the $K_3$ relay holding coil 6 through its own contacts 206$a$ and 206$b$ and, at the same time, interrupts the $\phi 2$ energized operate path for the $K_2$ operating coil 4 provided by $K_3$ contacts 206$a$ and 206$b$ and contacts 208$a$ and 208$b$ on the $K_2$ relay. Thus, when the next $\phi 2$ period commences, relay $K_2$ will drop out thereby "resetting" the trigger flip-flop portion of the full adder.

It can also be shown that if $B=0$ and a carry $Ci$ from the previous stage exists, i.e., the previous stage relay $K_5$ is energized, then either relay $K_1$ or $K_3$ will be energized depending upon the state of relay $K_2$. The $\phi 1$ energized operate path for the appropriate relay is provided by the previous stage $K_5$ relay contacts 198$a$ and 198$c$.

Turning now to the single stage shift register portion of the full adder, if a carry $Ci$ from the previous stage $K_5$ relay exists, and either A or B have a logic value of 1, or if A and B both have a logic value of 1, then a carry $Co$ will be set in relay $K_4$ during $\phi 1$ time. At the beginning of the next succeeding $\phi 2$ time, the carry $Co$ is transferred to relay $K_5$ and thereafter, during the following $\phi 1$ period, acts upon the next stage of the full adder. This operation can be described in terms of the applicable relay contacts in the following manner. Assuming that $A=0$ and $B=1$, then a ground pulse on line 196 will be applied through the previous stage $K_5$ relay contacts 210$a$ and 210$b$ to the operating coil 4 of relay $K_4$ causing that relay to operate during $\phi 1$ time. However, if the logic values are reversed, that is, $A=1$ and $B=0$, relay $K_2$ will be energized and the associated relay contacts 212$a$, 212$b$, 214$a$ and 214$b$ will be closed. Since $B=0$, only the latter relay contacts 214$a$ and 214$b$ need be considered at this time. With both the flip-flop relay $K_2$ and the previous stage $K_5$ relay energized, a $\phi 1$ pulse will be sent through $K_5$ contacts 216$a$ and 216$b$ and the now closed $K_2$ contacts 214$a$ and 214$b$ to the operating coil 4 of relay $K_4$ causing relay $K_4$ to operate during $\phi 1$.

A carry $Co$ is also set in relay $K_4$ if both binary digits have a logic value of 1 and there is no carry $Ci$ from the previous stage $K_5$ relay. Under these conditions, the ground pulse on input line 196 is applied to the $K_4$ relay operating coil 4 through the closed $K_2$ contacts 212$a$ and 212$b$.

The operation of relay $K_4$ during $\phi 1$ establishes a $\phi 2$ energized holding path for the $K_4$ relay through its own contacts 218$a$ and 218$b$ and a $\phi 2$ energized operate path for relay $K_5$ through $K_4$ contacts 220$a$ and 220$b$. During the next $\phi 2$ period, relay $K_5$ energizes thereby setting up its own $\phi 1$ energized holding path through $K_5$ contacts 222$a$ and 222$b$ and at the same time closing output contacts 224$a$ and 224$b$. At the commencement of the next succeeding $\phi 1$ period, a $\phi 1$ pulse or carry $Co$ is coupled to the next stage of the adder through contacts 222$a$ and 222$b$.

Symbolically the initiation of the trigger T and carry $Co$ to the next stage is:

$$T=(CiB'+CiB)$$
$$Co=(CiA+CiB+AB)$$

The middle stage of the full adder depicted in FIG. 16 can be duplicated for successive stages as desired and, as in conventional binary adders, the first stage does not require any previous carry contacts, and the last stage of the adder does not have to generate or hold a carry.

Although the dry-switching relay circuit depicted in FIG. 16 fulfills the requirements of a full adder, it may be desirable to modify the circuitry in certain instrumentations where the B signals have other functions to perform. The reason for modifying the full adder can be seen by referring back to FIG. 16 for a moment. If the binary digits A and B both have a logic value of 1 and a carry $Ci$ is present, the $B=1$ line 196 will get a $\phi 1$ pulse through $K_2$ contacts 212$a$ and 212$b$. The presence of this pulse does not affect the operation of the adder, but may require suppression if the B signals go to other circuits. A diode can, of course, be used to provide the necessary suppression of the $\phi 1$ pulse, but if complete isolation is required, the circuit should be modified.

Figure 17:
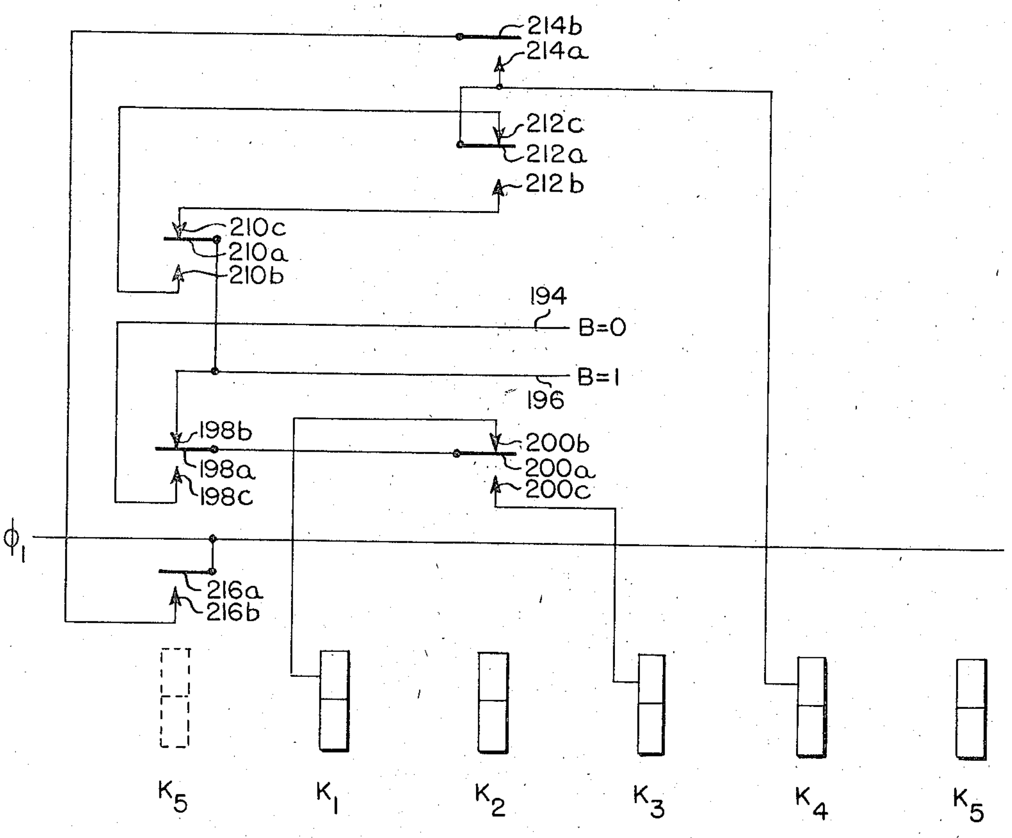
FIG. 17 is a block diagram showing a modification of the full adder depicted in FIG. 16.

A complete isolation of the inputs from spurious grounds can be achieved by modifying the carry circuit of the full adder as shown in FIG. 17. Portions of the full adder depicted in FIG. 16 have been omitted from FIG. 17 in order to emphasize the carry circuit modifications, however, it should be understood that the omitted portions form an integral part of the modified full adder.

The carry circuit is modified by adding another contact 210$c$ to the previous stage $K_5$ relay contacts 210$a$ and 210$b$ to form a single pole, double throw transfer contact. A similar SPDT transfer contact is provided on relay $K_2$ by adding contact 212$c$ to contacts 212$a$ and 212$b$.

The interconnecting circuitry between the transfer contacts 210 and 212 and the applicable relays of the modified full adder is shown in FIG. 17. If the same conditions are assumed, i.e., $A=1$, $B=0$ and a carry $Ci$ is present, the $\phi 1$ pulse will be applied to the operating coil of relay $K_4$ as described above, but not to the $B=1$ line because the path to line 196 has been broken by the energization of the previous stage $K_5$ relay and relay $K_2$. The operation of the carry circuit for $A=0$, $B=1$ and carry $Ci$ present is essentially the same as described with regard to FIG. 16, but the operating coil of relay $K_4$ is now grounded through a different path established through contacts 210$a$ and 210$b$ on the previous stage $K_5$ relay and contacts 212$a$ and 212$b$ on relay $K_2$. If both binary digits have a logic value of 1, the grounding pulse on the $B=1$ line is applied ot the $K_4$ operating coil through contacts 210$a$, 210$c$, 212$b$ and 212$a$.

The output of the $K_1$ through $K_5$ stage of the full adder is taken from line 225 and coupled to the next stage of the adder. If the described stage comprises the last stage of the full adder, the carry $Co$ on line 225 can be applied to an appropriate utilization means (not shown). The logic value of binary digit A is determined by the energization stage of relay $K_2$ so that a $\phi 1$ pulse will appear on line 227 during $\phi 1$ time if $A=0$ and on line 229 if $A=1$. Readout of bit A can be obtained by connecting output leads 227 and 229 to the utilization means mentioned above.

*Single-pulse generator*

Figure 18:
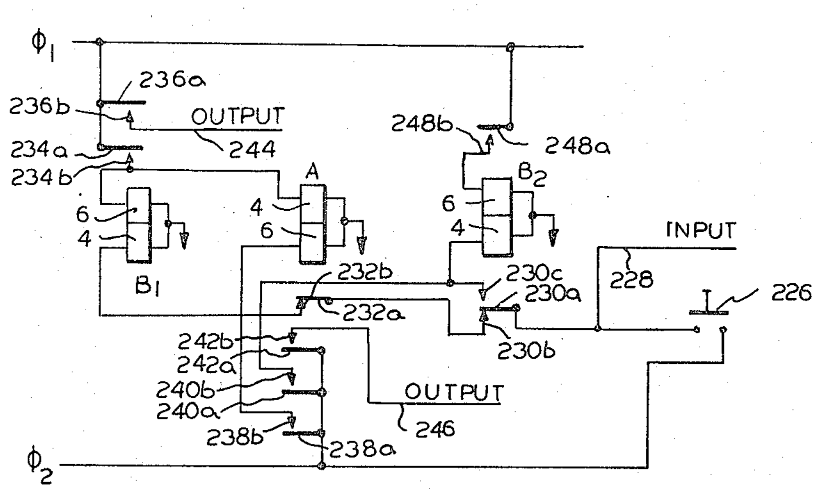
FIG. 18 is a block diagram of a dry-switching relay single pulse generator.

Another embodiment of the subject invention is shown in FIG. 18 wherein the dry-switching relays perform the functions of a single-pulse generator. The operation of the single-pulse generator is somewhat analogous to a "one-shot multivibrator" in that all relays are normally inactive, and when one relay is operated, as hereinafter described, the relays produce exactly one $\phi 1$ pulse and exactly one $\phi 2$ pulse and then return to their normal inactive or de-energized state.

The operation of the single generator is initiated during $\phi 2$ time either by closing a normally open push button switch 226 or by applying an input pulse on line 228. If the push button switch 226 is closed during $\phi 2$, the operating coil 4 of relay $B_1$ will be energized by $\phi 2$ power through the path provided by $B_2$ relay contacts 230$a$ and 230$b$ and A relay contacts 232$a$ and 232$b$. The energization of relay $B_1$ during $\phi 2$ time closes $B_1$ relay holding contacts 234$a$ and 234$b$ and the $\phi 1$ output contacts 236$a$ and 236$b$. At the beginning of the next $\phi 1$ period, relay $B_1$ holds through its contacts 234$a$ and 234$b$ and a $\phi 1$ output pulse is sent through the now closed contacts 236$a$ and 236$b$. Since contacts 236$a$ and 236$b$ were closed during the previous $\phi 2$ time, and the output pulse occurs during $\phi 1$, it can be seen that these contacts are operated in dry-switching mode.

The $B_1$ relay holding contacts 234$a$ and 234$b$ also provide a $\phi 1$ energized operate path for the A relay operating coil 4. The energization of relay A during the next $\phi 1$ period establishes a $\phi 2$ energized holding path for the A relay holding coil 6 through A relay contacts 238a and 238b. At the same time, A relay contacts 240a and 240b are closed to provide a $\phi 2$ energized operate path for the $B_2$ operating coil 4 while A relay contacts 242a and 242b complete the $\phi 2$ output path. In addition, the energization of the A relay also interrupts the $\phi 2$ energized operate path for the $B_1$ relay by opening A relay contacts 232a and 232b. When $\phi 1$ ends and the next i.e., second $\phi 2$ time since generator initiation begins, the A relay will hold through its own contacts 238a and 238b and a $\phi 2$ pulse will be sent through A relay contacts 242a and 242b as an output pulse. Since these contacts were closed during the previous $\phi 1$ time and are energized during the next $\phi 2$ time, dry-switching has also been achieved with respect to the $\phi 2$ output. The $\phi 1$ and $\phi 2$ outputs from lines 244 and 246, respectively, can be coupled to an appropriate utilization means, now shown.

At the commencement of the second $\phi 2$ period mentioned above, the B2 relay is energized by $\phi 2$ signals through the operate path provided by A relay contacts 240a and 240b. The energization of relay $B_2$ closes $B_2$ relay holding contacts 248a and 248b and latching contacts 230a and 230c. If the push button 226 is held closed, the $B_2$ relay will remain energized during alternate $\phi 1$ and $\phi 2$ pulses through its holding contacts 248a and 248b and latching contacts 230a and 230c. If the push button 226 is released after initiating the above-described operational sequence, the $B_2$ relay will hold during the next $\phi 1$ period and then drop out thus returning the entire circuit to its original inactive state.

The embodiments of the dry-switching relay apparatus described above and illustrated in FIGS. 1–18 demonstrate the minimum requirements of the invention, that is, two phases of power or control signals and two points of relay energization. The A and B relays depicted in the above-mentioned figures have been shown with two coils connected at a common point. Whether this connection occurs inside the relay or is external thereto is immaterial to the operation of the dry-switching circuit. Furthermore, identical performance can also be obtained with two separate, unconnected coils and two separate power supplies or with one coil and two isolating diodes at the input.

The dry-switching relay apparatus can be extended to have a greater number of relay input points than the two input points shown in the above-mentioned figures. It is well known that additional relay input points can, in some cases, reduce the number of relay contacts as well as the number of relays required for a given function. This is equally applicable to the dry-switching relay apparatus of the subject invention.

Figure 19:
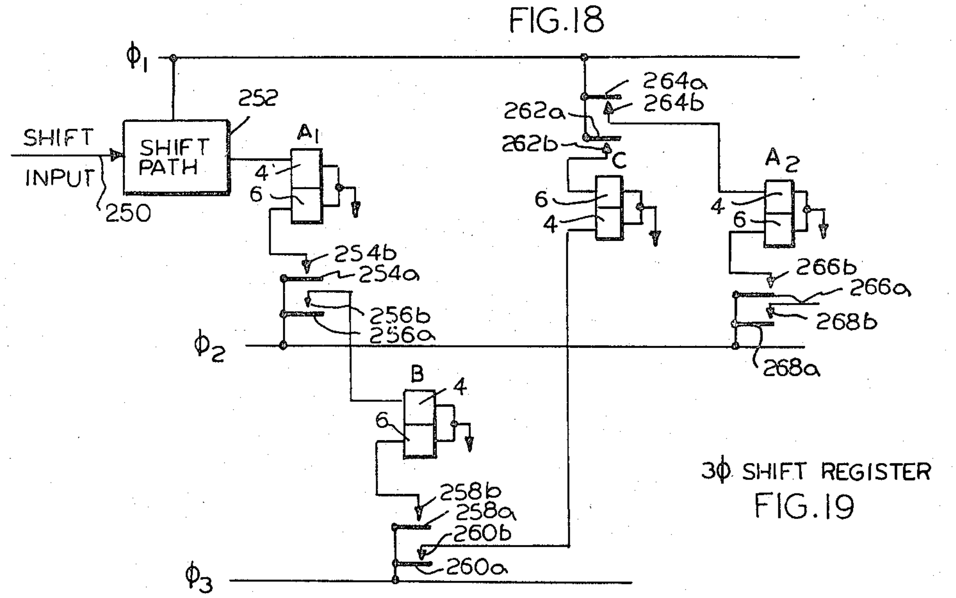
FIG. 19 is a block diagram of a three phase, dry-switching relay shift register.

The dry-switching relay apparatus can also be extended to employ additional phases of power as shown, for example, in the three-phase embodiment of a shift register depicted in FIG. 19. The three-phase dry-switching shift register has four relays identical as $A_1$, $A_2$, B and C. Relays $A_1$ and $A_2$ are identical to the previously described A relays in that they are initially operated by $\phi 1$ power. Similarly, the B relay shown in the three-phase shift register of FIG. 19 is identical to the other B relays and is initially operated by $\phi 2$ power. The C relay is essentially the same as relays $A_1$, $A_2$ and B in its electrical characteristics, however, the C relay is initially operated by a third power phase.

The three-phase shift register is actuated whenever a shift input appears on line 250 during $\phi 1$. The shift input closes shift path 252 which applies a $\phi 1$ pulse to the operating coil 4 of relay $A_1$. The energization of relay $A_1$ completes a holding path for the $A_1$ holding coil 6 through $A_1$ holding contacts 254a and 254b and creates a $\phi 2$ energized operate path for the B relay operating coil 4 through $A_1$ relay contacts 256a and 256b. At the beginning of the next $\phi 2$ period, the B relay operates while the A1 relay holds. The energization of the B relay closes holding contacts 258a and 258b and completes a $\phi 3$ energized operate path for the C relay operating coil 4 through the B relay contacts 260a and 260b.

When $\phi 3$ begins, the $A_1$ relay drops out, the B relay holds through its contacts 258a and 258b and the C relay is operated by $\phi 3$ power through B relay contacts 260a and 260b. During the next $\phi 1$ period, i.e., the second occurrence of a $\phi 1$ period after shift initiation, the C relay holds through its own holding contacts 262a and 262b and a $\phi 1$ pulse is sent through C relay contacts 264a and 246b to the operating coil 4 of relay $A_2$. The energization of relay $A_2$ closes holding contacts 266a and 266b and contacts 268a and 268b which are connected to the next stage, not shown, of the shift register. At the beginning of the next $\phi 2$ time, a $\phi 2$ pulse is sent to the following stage through the output contacts 268a and 268b.

The action of the three-phase shift register can be summarized as follows: the $A_1$ relay operates during $\phi 1$, is held during $\phi 2$ and drops out during $\phi 3$; relay B is operated from relay A during $\phi 2$, holds during $\phi 3$ and releases during $\phi 1$; relay C is operated from relay B during $\phi 3$, holds during $\phi 1$ and releases during $\phi 2$; and, finally, the operation of relay $A_2$ is the same as relay $A_1$.

Figure 20:
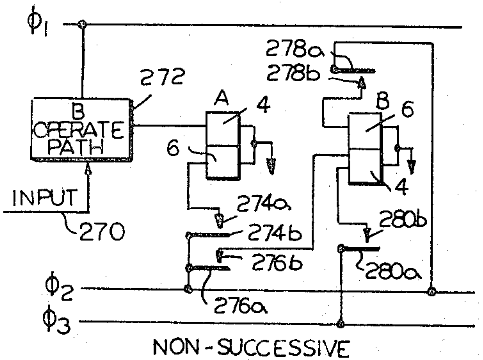
FIG. 20 is a block diagram of a nonsuccessive phase dry-switching relay circuit.

Although the three-phase shift register depicted in FIG. 19 and described above illustrates the use of three-phase synchronous power to achieve a dry-switching mode of operation, the dry-switching apparatus of the subject invention is not limited to synchronous plural phase power or control signals. For example, an instrumentation of the basic dry-switching circuit for use with nonsuccessive plural phase control signals is shown in FIG. 20. The nonsuccessive three-phase dry-switching apparatus utilizes an A relay of the type described previously and a three input B relay wherein the operating coil 4 can be energized by either $\phi 2$ or $\phi 3$ control signals as will be explained below. If the $\phi 1$ and $\phi 2$ control signals are successive and the $\phi 3$ control signal commences at the beginning of a $\phi 1$ period and terminates at the end of a $\phi 1$ period, then the $\phi 3$ control signal can serve as a variable duration holding line in synchronism with $\phi 1$ and $\phi 2$, but not occurring successively therewith.

The operation of the nonsuccessive, three-phase dry-switching apparatus depicted in FIG. 20 is initiated during $\phi 1$ time by an input on line 270 which provides a $\phi 1$ energized B operate path 272 for the A relay operating coil 4. The energization of the A relay establishes a $\phi 2$ energized holding path for the A relay holding coil 6 through holding contacts 274a and 274b and a $\phi 2$ energized operate path for the B relay operating coil 4 through contacts 276a and 276b. During the next $\phi 2$ period, the A relay holds while the B relay operates thereby forming its own $\phi 2$ energized holding path through B relay contacts 278a and 278b. In addition, the energization of the B relay during $\phi 2$ time also establishes a $\phi 3$ energized latching path for the B relay operating coil 4 through B relay contacts 280a and 280b. Relay B will therefore be operated during $\phi 2$ and held for a period of time corresponding to the duration of the $\phi 3$ control signal. Since the $\phi 3$ control signals are in synchronism with the $\phi 1$ signals and the B relay is also held by $\phi 2$ signals through B relay contacts 278a and 278b, the $\phi 1$ control signals can be used through other B relay contacts (not shown) in a dry-switching manner. The additional relay contacts and utilization means coupled thereto have been omitted from FIG. 20 because their use will be clearly understood from an inspection of the dry-switching relay apparatus depicted in FIG. 1.

Since numerous other modifications will now be apparent to those skilled in the art, as for example, varying the number of phases and inputs from the basic two-phase, two-input dry-switching relay apparatus, the subject invention is not intended to be limted to the precise form shown herein, but instead it is to be defined by the scope of the claims appended hereto.

Having thus described and disclosed the preferred embodiments of my invention, what I claim as new and desire to secure by Letters Patent of the United States is:

1. An electrical apparatus comprising: A and B relays each having a plurality of relay contacts forming A and B operate paths, respectively; means for energizing said A relay and said B operate paths during a first phase period; means for energizing said B relay and said A operate paths during a second phase period which alternates successively with said first phase period; input control means operative with either one of said A and B relay energizing means; and utilization means coupled to at least one of said A and B operate paths.

2. An electrical apparatus comprising: input control means for energizing an A relay during a first phase period; a plurality of relay contacts on said A relay forming A operate paths energized during a second phase period which alternates successively with said first phase period; means responsive to the energization of said A relay for holding said A relay operated during said second phase period and for energizing a B relay during the same phase period; a plurality of relay contacts on said B relay forming B operate paths energized during said first phase period; means responsive to the energization of said B relay for holding said B relay operated during the next succeeding first phase period; and utilization means coupled to at least one of said A and B operate paths.

3. A dry-switching electrical apparatus comprising: A and B relays each having an operating coil, a holding coil and a plurality of relay contacts forming, respectively, A and B operate paths, said B and A operate paths being energized by phase 1 and 2 antiphase control signals, respectively; input responsive means for providing a phase 1 energized operate path for said A relay operating coil; means responsive to the energization of said A relay for providing a phase 2 energized holding path for said A relay holding coil and a phase 2 energized operate path for said B relay operating coil; means responsive to the energization of said B relay for providing a phase 1 energized holding path for said B relay holding coil; and utilization means coupled to at least one of said A and B operate paths.

4. A dry-switching electrical apparatus comprising: A and B relays each having an operating coil, a holding coil and a plurality of relay contacts forming A and B operate paths, respectively, said B and A operate paths being energized by phase 1 and 2 antiphase control signals, respectively; means responsive to a nonsynchronous input for providing a phase 1 energized operate path for said A relay operating coil; means responsive to the energization of said A relay for providing a phase 1 energized latching path for said A relay operating coil, a phase 2 energized holding path for said A relay holding coil and a phase 2 energized operate path for said B relay operating coil; means responsive to the energization of said B relay for interrupting said A relay operating coil latching path and for providing a phase 1 energized holding path for said B relay holding coil; and utilization means coupled to at least one of said A and B operate paths.

5. A dry-switching electrical apparatus comprising: A and B relays each having an operating coil, a holding coil and a plurality of relay contacts forming A and B operate paths, respectively, said B and A operate paths being energized by phase 1 and 2 antiphase control signals, respectively; means responsive to a nonsynchronous input for providing a phase 1 energized operate path for said A relay operating coil; means responsive to the energization of said second A relay for providing a second phase 1 energized latching path for said second A relay operating coil, a phase 2 energized holding path for said second A relay holding coil and a phase 2 energized operate path for said B relay operating coil; means responsive to the energization of said B relay for interrupting said second latching path, and for providing a phase 1 energized holding path for said B relay holding coil; and utilization means coupled to at least one of said A and B operate paths.

6. A dry-switching electrical apparatus comprising: a first A relay having an operating coil and a holding coil; a second A relay and a B relay each having an operating coil, a holding coil and a plurality of relay contacts forming A and B operate paths, respectively, said B and A operate paths being energized by phase 1 and 2 antiphase control signals, respectively; means responsive to a nonsynchronous input for providing a phase 1 energized operate path for said first A relay operating coil; means responsive to the energization of said first A relay for providing a phase 1 energized holding path for said first A relay holding coil and a first phase 1 energized latching path for said second A relay operating coil; means responsive to the energization of said second A relay for providing a second phase 1 energized latching path for said second A relay operating coil, a phase 2 energized holding path for said second A relay holding coil and a phase 2 energized operate path for said B relay operating coil; means responsive to the energization of said B relay for interrupting said second latching path and for providing a phase 1 energized holding path for said B relay holding coil; and utilization means coupled to at least one of said A and B operate paths.

7. A dry-switching relay serial delay line comprising; a plurality of sequentially alternating A and B relays each having an operating coil, a holding coil and a plurality of relay contacts forming, respectively, A and B operate paths, said B and A operate paths being energized by phase 1 and 2 antiphase control signals, respectively; input responsive means for providing a phase 1 energized operate path for said first A relay operating coil; means responsive to the energization of an A relay operating coil for providing a phase 2 energized holding path for the same A relay holding coil and a phase 2 energized operate path for the operating coil of the next succeeding B relay; means responsive to the energization of a B relay operating coil for providing a phase 2 energized holding path for the same B relay holding coil and a phase 2 energized operate path for the operating coil of the next succeeding A relay; and utilization means coupled to at least one of said A and B operate paths whereby an input to said input responsive means will cause the first A relay and all succeeding relays to be sequentially operated for two successive phase times.

8. A dry-switching relay serial delay line comprising: a plurality of sequentially alternating A and B relays each having an operating coil, a holding coil and a plurality of relay contacts forming, respectively, A and B operate paths, said B and A operate paths being energized by phase 1 and 2 antiphase control signals, respectively; input responsive means for selectively energizing the operating coils of said A and B relays; means responsive to the energization of an A relay operating coil for providing a phase 2 energized holding path for the same A relay holding coil and a phase 2 energized operate path for the operating coil of the next succeeding B relay; means responsive to the energization of a B relay operating coil for providing a phase 1 energized holding path for the same B relay holding coil and a phase 1 energized operate path for the operating coil of the next succeeding A relay; and utilization means coupled to at least one of said A and B operate paths whereby an input to any selected relay will cause that relay and all succeeding relays to be sequentially operated for two successive phase times.

9. A nonsuccessive three-phase dry-switching relay apparatus comprising: A and B relays each having an operating coil, a holding coil and a plurality of relay contacts forming A and B operate paths, respectively, said B and A operate paths being energized by phase 1 and 2 antiphase control signals, respectively; input responsive means for providing a phase 1 energized operate path for said A relay operating coil; means responsive to the energization of said A relay for providing a phase 2 energized holding path for said A relay holding coil and a phase 2 energized operate path for said B relay operating coil; means responsive to the energization of said B relay for providing a phase 2 energized holding path for said B relay holding coil and an operate path for said B relay operating coil, said operate path being energized by nonsuccesive phase 3 control signals which are in synchronism with said phase 1 control signals; and utilization means coupled to at least one of said A and B operate paths.

References Cited

UNITED STATES PATENTS 3,299,249 1/1967 Sciaky ---------- 307—135 XR

ORIS L. RADER, *Primary Examiner.*

T. B. JOIKE, *Assistant Examiner.*

UNITED STATES PATENT OFFICE

CERTIFICATE OF CORRECTION

Patent No. 3,376,428 April 2, 1968

William R. Nugent

It is certified that error appears in the above identified patent and that said Letters Patent are hereby corrected as shown below:

Column 2, line 63, "provious" should read -- previous --. Column 4, line 46, "during" should read -- duration --. Column 5, lines 49 and 50, cancel "is therefore dry-switching". Column 12, line 49, "P2" should read -- Ø2 --. Column 13, line 65, "counter-up" should read -- count-up --.

Signed and sealed this 23rd day of September 1969.

(SEAL)
Attest:

Edward M. Fletcher, Jr.
Attesting Officer

WILLIAM E. SCHUYLER, JR.
Commissioner of Patents